United States Patent
Chung et al.

(10) Patent No.: US 11,386,689 B2
(45) Date of Patent: Jul. 12, 2022

(54) METHOD FOR FINGERPRINT SENSING IN AN ELECTRONIC MODULE CAPABLE OF FINGERPRINT SENSING, ELECTRONIC MODULE CAPABLE OF FINGERPRINT SENSING, AND COMPUTING APPARATUS

(71) Applicant: NOVATEK MICROELECTRONICS CORP., Hsinchu (TW)

(72) Inventors: Jung-Chen Chung, Zhubei (TW); Chi-Ting Chen, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 47 days.

(21) Appl. No.: 17/123,150

(22) Filed: Dec. 16, 2020

(65) Prior Publication Data
US 2021/0303811 A1    Sep. 30, 2021

Related U.S. Application Data

(60) Provisional application No. 62/994,328, filed on Mar. 25, 2020.

(51) Int. Cl.
*G06V 40/13* (2022.01)
*G06F 3/044* (2006.01)
*G06V 40/12* (2022.01)

(52) U.S. Cl.
CPC .............. *G06V 40/13* (2022.01); *G06F 3/044* (2013.01); *G06V 40/1306* (2022.01); *G06V 40/1318* (2022.01); *G06V 40/1365* (2022.01)

(58) Field of Classification Search
None
See application file for complete search history.

(56) References Cited

U.S. PATENT DOCUMENTS

| | | | |
|---|---|---|---|
| 7,414,552 B2 * | 8/2008 | Chou | H03M 1/0682 341/118 |
| 2016/0148034 A1 * | 5/2016 | Kremin | G06V 40/1306 382/124 |

* cited by examiner

*Primary Examiner* — Nicholas J Lee

(57) ABSTRACT

A method for fingerprint sensing of an electronic module capable of fingerprint sensing, the electronic module for being coupled to a plurality of fingerprint sensing pixels, the electronic module including an analog front-end stage for being coupled to the fingerprint sensing pixels, the method comprising the following steps. A first scanning operation is performed on at least a first portion of the fingerprint sensing pixels by using a first reference signal being applied to a reference terminal of the analog front-end stage to obtain a level of a second reference signal which is based on a sensing result of the first scanning operation and is different from the first reference signal. A second scanning operation is performed on at least a second portion of the fingerprint sensing pixels by using the second reference signal being applied to the reference terminal of the analog front-end stage.

36 Claims, 20 Drawing Sheets

Performing a first scanning operation on at least a first portion of the fingerprint sensing pixels by using a first reference signal being applied to a reference terminal of the analog front end stage to obtain a level of a second reference signal based on a sensing result of the first scanning operation ~S10

Performing a second scanning operation on at least a second portion of the fingerprint sensing pixels by using the second reference signal being applied to the reference terminal of the analog front end stage, wherein the second reference signal is different from the first reference signal ~S20

FIG.1F

METHOD FOR FINGERPRINT SENSING IN AN ELECTRONIC MODULE CAPABLE OF FINGERPRINT SENSING, ELECTRONIC MODULE CAPABLE OF FINGERPRINT SENSING, AND COMPUTING APPARATUS

CROSS-REFERENCE TO RELATED APPLICATION

This non-provisional application claims priority under 35 U.S.C. § 119(e) on U.S. provisional Patent Application No. 62/994,328, filed on Mar. 25, 2020, the entire contents of which are hereby incorporated by reference.

BACKGROUND OF THE INVENTION

1. Field of the Invention

The present disclosure relates to a technology for fingerprint sensing in a computing apparatus, and in particular to a method for fingerprint sensing of an electronic module capable of fingerprint sensing with dynamic reference signal adjustment, an electronic module capable of fingerprint sensing, and a computing apparatus using the same.

2. Description of the Related Art

For computing devices, such as smart phones, tablet computers or other information processing devices, fingerprint sensing has become standard functionality of computing devices to meet the emerging needs for enhancing security in various applications such as fingerprint identification in unlocking a computing device etc.

Some electronic devices, such as smart phones, that are available provide fingerprint sensing functionality on the display panel of a computing device so that the user can unlock the computing device by directly placing their finger on the display panel. In order to fulfil this functionality, fingerprint sensing elements are required to be implemented, corresponding to at least one portion of the display panel of the computing device. The signal reading traces required to be coupled to the fingerprint sensing elements will be longer if the fingerprint sensing elements are designed to correspond to a greater portion or even the entire display panel. Parasitic capacitances for the signal reading traces will become greater as well. An analog front-end circuit for reading the fingerprint sensing signals from the fingerprint sensing elements through the signal reading traces will be susceptible to time delays due to the parasitic capacitances. In this case, fingerprint sensing effectiveness and efficiency will inevitably be degraded. Accordingly, it is also challenging when the fingerprint sensing functionality is to be implemented on the full-screen of the display panel; especially the time required for sampling the fingerprint sensing signals becomes longer and unfortunately the time allowed for processing the fingerprint sensing signals is limited.

BRIEF SUMMARY OF THE INVENTION

An objective of the present disclosure is to provide a technology for facilitating fingerprint sensing signal sampling in a computing device. The technology is for dynamic reference signal adjustment in an electronic module capable of fingerprint sensing signal sampling. By utilizing the technology, the electronic module capable of fingerprint sensing signal sampling can perform reference signal adjustment dynamically so as to reduce the settling time of an analog front-end circuit of the electronic module.

To achieve at least the above objective, the present disclosure provides a method for fingerprint sensing by an electronic module capable of fingerprint sensing, the electronic module coupled to a fingerprint sensor having a plurality of fingerprint sensing pixels, the electronic module including an analog front-end stage for being coupled to the fingerprint sensing pixels, the method comprising the following steps. A first scanning operation is performed on at least a first portion of the fingerprint sensing pixels by using a first reference signal being applied to a reference terminal of the analog front-end stage in order to obtain a level of a second reference signal based on a sensing result of the first scanning operation. A second scanning operation is performed on at least a second portion of the fingerprint sensing pixels by applying the second reference signal to the reference terminal of the analog front-end stage, wherein the second reference signal is different from the first reference signal.

In some embodiments, the second portion includes the first portion.

In some embodiments, the second portion corresponds to a fingerprint sensing area, and the first portion corresponds to a representative region of the fingerprint sensing area.

In some embodiments, the first scanning operation comprises reading sensing signals from at least one sample fingerprint sensing pixel located in the representative region of the fingerprint sensing area and the second scanning operation comprises reading sensing signals from all fingerprint sensing pixels corresponding to the fingerprint sensing area.

In some embodiments, the method further comprises performing a reset operation prior to the first scanning operation.

In some embodiments, the method further comprises the following steps. A level of a third reference signal is obtained by the second scanning operation. A third scanning operation is performed on at least the second portion of the fingerprint sensing pixels by applying the third reference signal to the reference terminal of the analog front-end stage, wherein the third reference signal is different from the second reference signal.

In some embodiments, the first portion is equal to the second portion.

In some embodiments, each of the first portion and the second portion corresponds to a fingerprint sensing area.

In some embodiments, each of the first scanning operation and the second scanning operation comprises reading sensing signals of all fingerprint sensing pixels corresponding to the fingerprint sensing area.

In some embodiments, the method further comprises performing a respective reset operation prior to each of the first scanning operation and the second scanning operation.

In some embodiments, the method further comprises determining the level of the second reference signal based on an average value of fingerprint sensing values from performing the first scanning operation and the level of the first reference signal.

In some embodiments, the level of the second reference signal is equal to the average value of fingerprint sensing values subtracted from the level of the first reference signal.

In some embodiments, the analog front-end stage comprises an operational amplifier having an input terminal serving as the reference terminal of the analog front-end stage.

In some embodiments, the second reference signal is determined in order to reduce a convergence time of the operational amplifier.

In some embodiments, the method further comprises the following steps. An average value of fingerprint sensing values is determined from performing the first scanning operation. The level of the second reference signal is determined based on the average value of the fingerprint sensing values.

In some embodiments, the level of the second reference signal is equal to the average value of the fingerprint sensing values subtracted from the level of the first reference signal.

To achieve at least the above objective, the present disclosure provides an electronic module capable of fingerprint sensing, for being coupled to a fingerprint sensor having a plurality of fingerprint sensing pixels. The electronic module comprises a fingerprint sensing driver circuit. The fingerprint sensing driver circuit includes a fingerprint sensing circuit and a control unit. The fingerprint sensing circuit is for being coupled to the fingerprint sensor and obtaining fingerprint sensing data, and includes an analog front-end stage. The control unit, coupled to the fingerprint sensing circuit, is for fingerprint sensing. The control unit is configured to perform a plurality of operations. The operations include a first scanning operation on at least a first portion of the fingerprint sensing pixels by applying a first reference signal to a reference terminal of the analog front-end stage in order to obtain a level of a second reference signal based on a sensing result of the first scanning operation. The operations also include a second scanning operation on at least a second portion of the fingerprint sensing pixels by applying a second reference signal to the reference terminal of the analog front-end stage, wherein the second reference signal is different from the first reference signal.

In some embodiments, the control unit is further configured to obtain a touch position on a touch panel, wherein the first scanning operation is performed on the first portion with respect to the touch position.

To achieve at least the above objectives, the present disclosure provides a computing apparatus comprising: a display panel with a fingerprint sensor, and an electronic module, coupled to the display panel, capable of fingerprint sensing.

In some embodiments, the electronic module can be configured to implement any one of the above embodiments or a combination of at least two or more thereof, whenever appropriate.

In some embodiments, the electronic module is a single chip.

BRIEF DESCRIPTION OF THE DRAWINGS

FIG. 1F is a flowchart illustrating a method for fingerprint sensing according to an embodiment.

DETAILED DESCRIPTION OF THE INVENTION

To facilitate understanding of the object, characteristics and effects of this present disclosure, embodiments together with the attached drawings for the detailed description of the present disclosure are provided.

The following provides various embodiments for the technology for facilitating enhancement of fingerprint sensing efficiency in a computing device. The technology is for dynamic reference signal adjustment in an electronic module capable of fingerprint sensing. By utilizing the technology, the electronic module capable of fingerprint sensing can perform reference signal adjustment dynamically so as to improve the quality of a fingerprint image output by the electronic module.

For the sake of illustration, in the following, embodiments of an electronic module capable of performing fingerprint sensing and a computing apparatus (or device) employing the electronic module are introduced firstly. Then, embodiments of a method for dynamic reference signal adjustment in an electronic module capable of fingerprint sensing are provided. Additional embodiments of the electronic module capable of performing fingerprint sensing and a computing apparatus (or device) employing the electronic module are then provided.

Figure 1A:
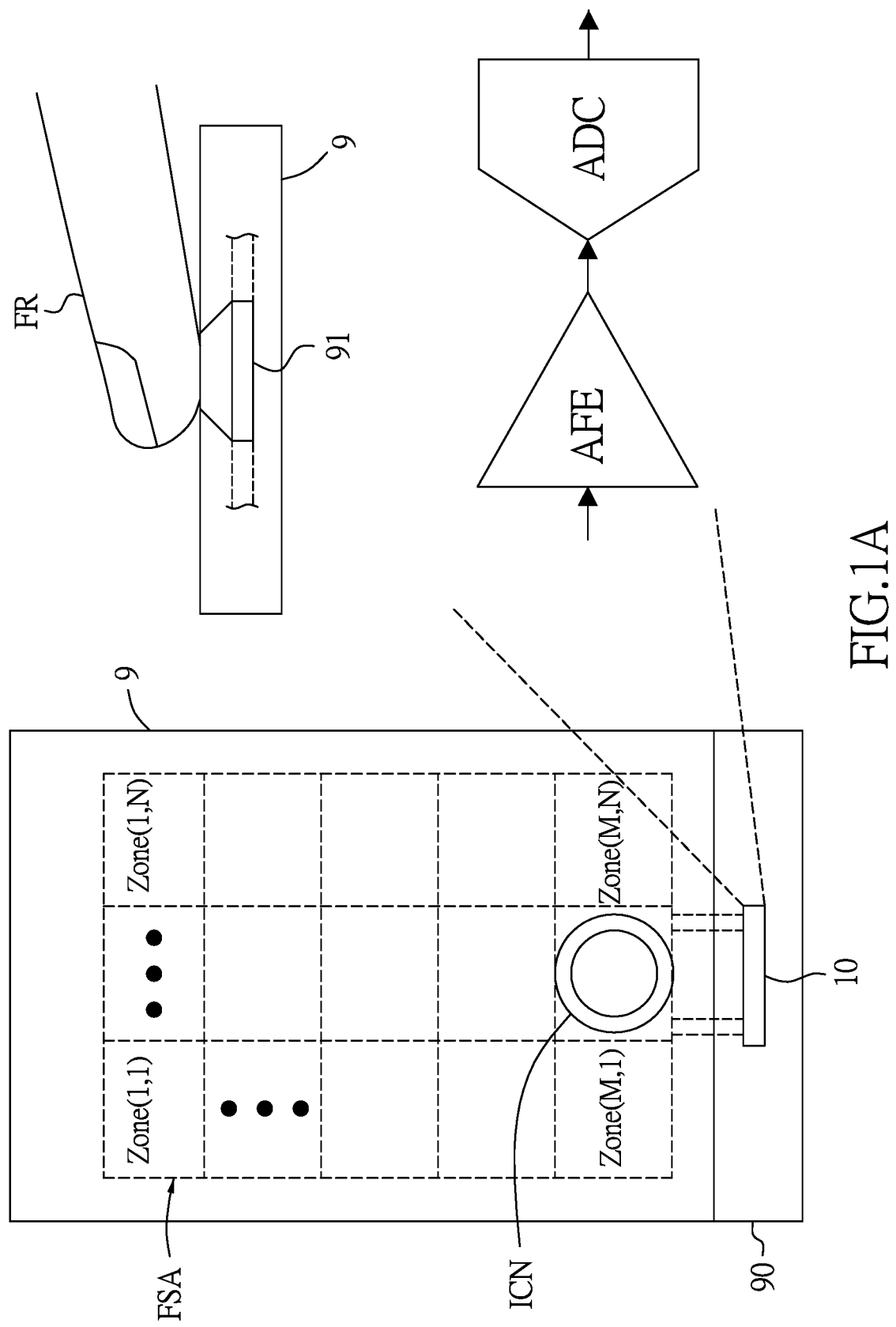
FIG. 1A shows a display panel with a fingerprint sensor and a fingerprint sensing driver circuit according to embodiments in a schematic form.
Figure 1B:
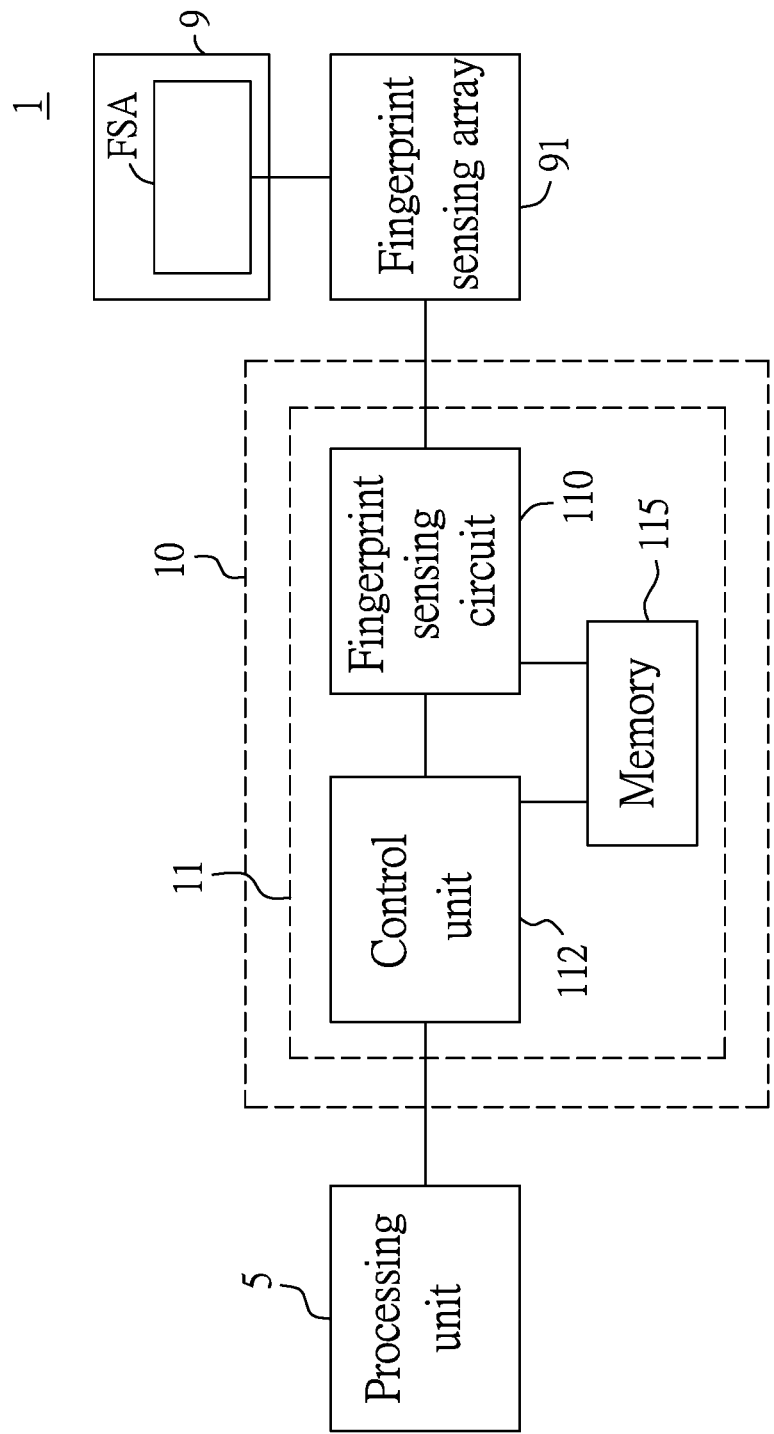
FIG. 1B is a block diagram illustrating implementation of fingerprint sensing in a computing device according to an embodiment.

FIG. 1A schematically illustrates a computing device including an electronic module 10 capable of performing fingerprint sensing and a display panel 9 with a fingerprint sensor coupled to the electronic module 10, according to an embodiment. Referring to FIG. 1B, the electronic module 10 capable of performing fingerprint sensing is illustrated, which can be employed in the computing device 1. As shown in FIG. 1B, the computing device 1 includes a processing unit 5, the electronic module 10 including a fingerprint sensing driver circuit 11, and the fingerprint sensor including a fingerprint sensing array 91. The electronic module 10 can be utilized for being coupled between the fingerprint sensing array 91 and the processing unit 5 to perform fingerprint sensing. The electronic module 10 can be configured to perform a method for dynamic reference signal adjustment in an electronic module capable of fingerprint sensing, as will be exemplified later in FIG. 1F.

Based on the architecture of the computing device 1 illustrated in FIGS. 1A and 1B, any electronic device such as a smart phone, tablet computer or any other information processing device can be realized, wherein the computing device 1 may further include, but not limited to, additional components such as memory (indicated by 115), circuits for wireless or wired communication, image capturing or so on, whenever appropriate.

The processing unit 5 is capable of being configured to receive fingerprint data from the electronic module 10 to provide specific functionality. For example, the processing unit 5 executes an application program, based on fingerprint identification, for example, under an operating system to obtain fingerprint image data derived from signals obtained from the fingerprint sensing array 91 through the electronic module 10. The computing device 1 (e.g., smart phone, tablet, and so on) can be configured to perform operations (e.g., user operation or function in a game) of the application program, which are associated with the fingerprint image data generated by the electronic module 10.

In FIGS. 1A and 1B, the fingerprint sensing driver circuit 11 can be utilized for being coupled to the fingerprint sensing array 91 and obtaining fingerprint sensing data from signals from the fingerprint sensing array 91. For example, the fingerprint sensing array 91 is implemented to include a plurality of fingerprint sensing elements (or called sensing pixels) in an arrangement over a fingerprint sensing area (FSA). For example, the fingerprint sensing driver circuit 11 is implemented for converting fingerprint signals received from the fingerprint sensing array 91 into corresponding digital fingerprint data, such as a set of raw fingerprint data associated with and distributed over the fingerprint sensing area FSA, as illustrated in FIG. 1A or 1B. The fingerprint data can be further obtained based on the digital fingerprint data, for example, by the fingerprint sensing driver circuit 11. In addition, the fingerprint sensing area FSA can be implemented corresponding to at least one portion of a screen of the display panel 9 where a finger (FR) can be placed, or can be implemented corresponding to the whole screen of the display panel 9.

Figure 1C:
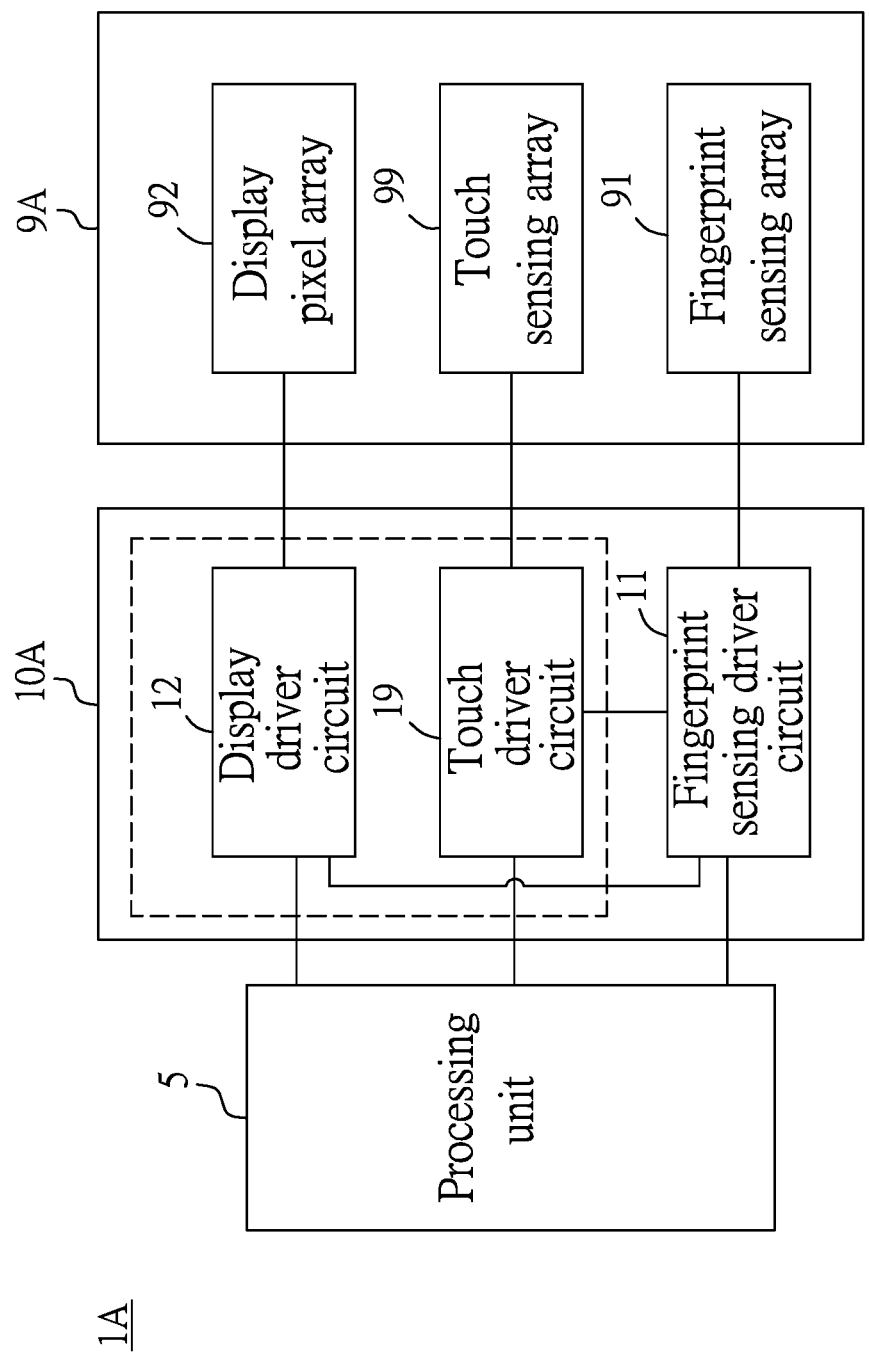
FIG. 1C is a block diagram illustrating implementation of an electronic module capable of performing fingerprint sensing in a computing device according to an embodiment.

The electronic module 10 can be implemented as a chip, for example. In another example, the electronic module 10 or 10A (as shown in FIG. 1C) can be implemented as a single chip to integrate and include a display driver circuit 12 and a touch driver circuit 19, in addition to the fingerprint sensing driver circuit 11. In FIG. 1C, the display driver circuit 12 and the touch driver circuit 19 are coupled to a display pixel array 92 and a touch sensing array 99 of the display panel 9A, respectively. In this manner, the electronic module (e.g., 10 or 10A) can be referred to as a fingerprint, touch, display driver integration (FTDI) IC. The electronic module 10 may be implemented as an FTDI IC disposed on a substrate 90 (e.g., glass or film, etc) by using a packaging approach such as tape carrier package (TCP), chip on film (COF), or chip on glass (COG), for example.

As shown in FIG. 1B, the fingerprint sensing driver circuit 11 may include a fingerprint sensing circuit 110 and a control unit 112 for fingerprint sensing. For example, the fingerprint sensing circuit 110 may include a fingerprint analog front-end (AFE) circuit and analog-to-digital conversion (ADC) circuit, for converting fingerprint signals received from the fingerprint sensing array 91 into corresponding digital fingerprint data, such as a set of raw fingerprint data associated with and distributed over the fingerprint sensing area FSA where a fingerprint (or a portion of a fingerprint) is detected. The fingerprint sensing data can be further obtained based on the digital fingerprint data, for example, by the control unit 112. The control unit 112, coupled to the fingerprint sensing circuit 110, can be utilized for fingerprint sensing, for example, to generate fingerprint sensing data based on the digital fingerprint data.

Referring to FIGS. 1A and 1B again, the influence of offsets in the signals received by the electronic module 10 is illustrated in an example. In the example, a fingerprint detection process involves operations of the display panel 9 and the electronic module 10. Initially, a user places his or her finger on a fingerprint sensing area FSA to make a touch event on the display panel 9. A touched position associated with the touch event can be detected by a touch driver circuit to output the touched position, wherein the touch driver circuit can be implemented inside the electronic module, as illustrated in FIG. 1C, or outside the electronic module. The electronic module (e.g., 10 or 10A) activates at least one fingerprint detection zone of the fingerprint sensing area FSA according to the touched position output by the touch driver circuit (e.g., 11) to start fingerprint sensing and then enters the fingerprint detection process. The fingerprint detection process, for example, includes: controlling the display panel (e.g., 9 or 9A) to emit light to the touched position where the finger is placed; receiving voltage signals into which the fingerprint sensing elements of the fingerprint sensing array 91 convert reflected light of the fingerprint ridges and valleys; amplifying the received voltage signals and performing analog-to-digital conversion by the AFE circuit and the ADC circuit of the electronic module (e.g., 10 or 10A), respectively; and outputting fingerprint image data (e.g., data representing the whole fingerprint image) to the processing unit 5 and performing a back-end algorithm for fingerprint identification. Accordingly, an unlocking process of the computing device (e.g., 1, 1A, 1B, or 1C) can be performed and completed based on fingerprint identification.

Referring to FIG. 1A, the fingerprint sensing elements (or fingerprint sensing pixels) of the fingerprint sensing array 91 may be distributed over the whole screen of the display panel 9 so that the computing device can be implemented to allow the user to unlock the computing device at any position on the screen. For example, the fingerprint sensing area FSA can be substantially equal to (such as being exactly equal to, slightly different from, or is within a tolerable range of, so as to facilitate full-screen fingerprint sensing of the panel) the extent of the screen. In full-screen fingerprint sensing applications, the fingerprint sensing area FSA or the screen can be divided into different fingerprint detection zones (e.g., represented by Zone (1,1) to Zone (M,N)) so that fingerprint identification can be performed with respect to the fingerprint detection zone(s) where a finger (FR) is placed.

Figure 1D:
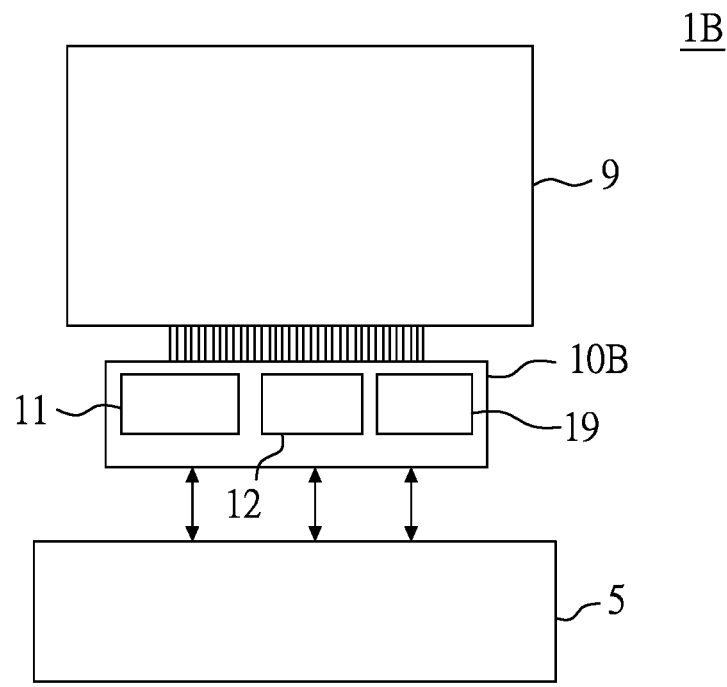
FIG. 1D is a block diagram illustrating implementation of an electronic module capable of performing fingerprint sensing in a computing device according to another embodiment.

In some embodiments, the electronic module (e.g., 10 or 10A) illustrated in FIG. 1A, 1B, or 1C is implemented in a single chip, thus leading to many benefits of circuit integration to the computing device 1. Refer to FIG. 1D, which illustrates examples of implementation of a single chip based on the configuration of the electronic module (e.g., 10 or 10A) of FIG. 1A, 1B, or 1C. As shown in FIG. 1D, an electronic module 10B is implemented in a single chip form, employed in a computing device 1B, and includes a fingerprint sensing driver circuit 11 and a touch driver circuit 19. The electronic module 10B may further include a display driving circuit 12 for being connected to the display pixel array (e.g., 92).

Figure 1E:
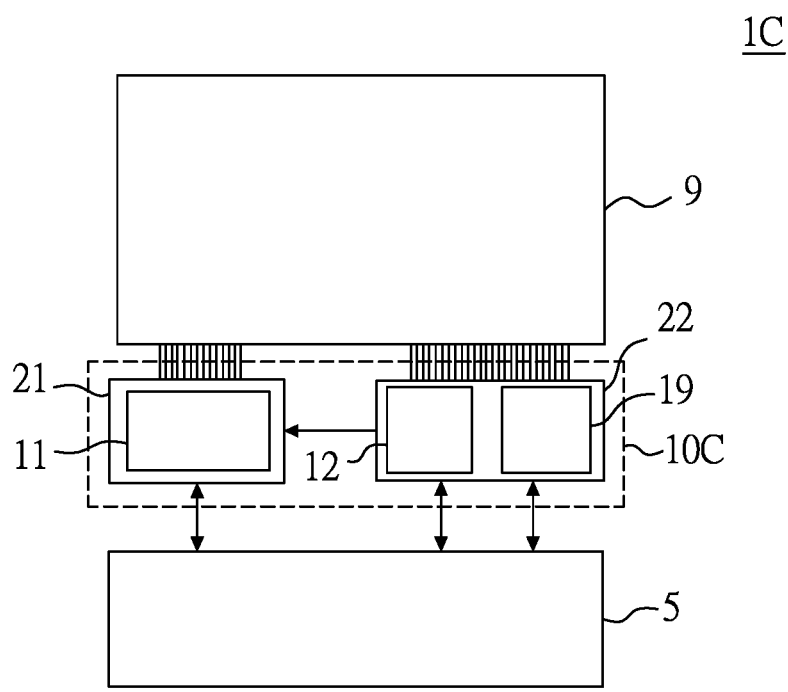
FIG. 1E is a block diagram illustrating implementation of an electronic module capable of performing fingerprint sensing in a computing device according to another embodiment.

It is noted that the electronic module 10, in some embodiments, can be implemented using multiple chips, according to design requirements while the electronic module (e.g., 10 or 10A) illustrated in FIG. 1A, 1B, 1C, or 1D is implemented in a single chip. For example, in some embodiments, the touch driver circuit and the fingerprint sensing driver circuit is implemented as different chips. In an embodiment shown in FIG. 1E, an electronic module 10C is employed in a computing device 1C and includes a first chip 21 and a second chip 22. The first chip 21 includes a fingerprint sensing driver circuit 11 while the second chip 22 includes a touch driver circuit 19. The first chip 21 may further include a display driving circuit 12 for being connected to the display pixel array (e.g., 92) so as to drive the display pixel array. Certainly, the implementation of the present disclosure is not limited to the examples.

Regarding hardware structures of the components in any of the embodiments of FIG. 1A to 1E, the fingerprint sensing driver circuit (e.g., 11), the display driver circuit (e.g., 12), and the touch driver circuit (e.g., 19) may be implemented, individually or integrally, based on a control circuit which includes a microcontroller-based or processor-based core having computational capability. Alternatively, the fingerprint sensing driver circuit (e.g., 11), the display driver circuit (e.g., 12), and the touch driver circuit (e.g., 19) may be designed, based on technique using hardware description languages (HDL) or any other design methods for digital circuits familiar to people skilled in the art and may be based on hardware circuits implemented using a field programmable gate array (FPGA), a complex programmable logic device (CPLD), or an application-specific integrated circuit (ASIC).

In some embodiments, the display pixel array 92 may be a liquid crystal display (LCD) pixel array, organic light emitting diode (OLED) pixel array, or any appropriate type of pixel array. The display panel 9, for example, can be implemented by an in-cell type or on-cell type touch display panel integrated with fingerprint sensing, wherein the fingerprint sensing array 91, the display pixel array 92, and the touch sensing array 99 are integrated in a layered manner or any appropriate manner. The touch sensing array 99 may be implemented by using a capacitive touch sensor in a form of touch sensing array. The fingerprint sensing array 91, for example, can be implemented by an optical fingerprint sensor, capacitive fingerprint sensor, ultrasonic fingerprint sensor, or any appropriate device for sensing fingerprint signals. Certainly, the implementation of the present disclosure is not limited thereto.

Embodiments of a method for performing fingerprint sensing will be illustrated below.

Referring to FIG. 1F, a method for performing fingerprint sensing is illustrated according to an embodiment in flowchart form. The method for performing fingerprint sensing can be implemented in an electronic module (e.g., 10) or specifically a fingerprint sensing driver circuit (e.g., 11), which is for being used to be coupled between a fingerprint sensing array 91 and a processing unit 5. The electronic module is for being coupled to the fingerprint sensing array 91 having a plurality of fingerprint sensing pixels, the electronic module including an analog front-end stage for being coupled to the fingerprint sensing pixels. As shown in FIG. 1F, the method includes the following steps, wherein the electronic module 10 is referenced for the sake of illustration only.

In step S10, a first scanning operation is performed on at least a first portion of the fingerprint sensing pixels by applying a first reference signal to a reference terminal of the analog front-end stage to obtain a level of a second reference signal based on a sensing result of the first scanning operation.

In step S20, a second scanning operation is performed on at least a second portion of the fingerprint sensing pixels by applying the second reference signal to the reference terminal of the analog front-end stage, wherein the second reference signal is different from the first reference signal.

Accordingly, the method of FIG. 1F is for dynamic reference signal adjustment in an electronic module capable of fingerprint sensing signal sampling. By utilizing the method of FIG. 1F, the electronic module capable of fingerprint sensing signal sampling can perform reference signal adjustment dynamically so as to reduce the settling time of an analog front-end circuit of the electronic module.

In addition, the time required for sampling the fingerprint sensing signals can be reduced, based on the technology for dynamic reference signal adjustment, and can be configured to be within a required time interval allowable for processing the fingerprint sensing signals, so as to resolve the challenge that the fingerprint sensing functionality is to be implemented on the full-screen of the display panel.

As a result, the computing device that executes an application program, such as fingerprint identification, based on the output of the electronic module can benefit from the technology for dynamic reference signal adjustment so as to facilitate fingerprint sensing effectiveness and efficiency, as a whole, of the application program.

In some embodiments, the second portion includes the first portion. For example, the second portion corresponds to a fingerprint sensing area (e.g., a touch area corresponding to a fingerprint on the panel or an area determined based the other related conditions), and the first portion corresponds to a representative region of the fingerprint sensing area.

In some embodiments, the first scanning operation comprises reading sensing signals from at least one sample fingerprint sensing pixel located in the representative region of the fingerprint sensing area and the second scanning operation comprises reading sensing signals from all fingerprint sensing pixels corresponding to the fingerprint sensing area.

In some embodiments, the method further comprises performing a reset operation prior to the first scanning operation.

In some embodiments, the method further comprises the following steps. A level of a third reference signal is obtained by the second scanning operation. A third scanning operation is performed on at least the second portion of the fingerprint sensing pixels by applying the third reference signal to the reference terminal of the analog front-end stage, wherein the third reference signal is different from the second reference signal.

In some embodiments, the first portion is equal to the second portion.

In some embodiments, each of the first portion and the second portion corresponds to a fingerprint sensing area.

In some embodiments, each of the first scanning operation and the second scanning operation comprises reading sensing signals of all fingerprint sensing pixels corresponding to the fingerprint sensing area.

In some embodiments, the method further comprises performing a respective reset operation prior to each of the first scanning operation and the second scanning operation.

In some embodiments, the method further comprises determining the level of the second reference signal based on an average value of fingerprint sensing values from the performing of the first scanning operation and the level of the first reference signal.

In some embodiments, the level of the second reference signal is equal to the average value of the fingerprint sensing values subtracted from the level of the first reference signal.

In some embodiments, the analog front-end stage comprises an operation amplifier having an input terminal serving as the reference terminal of the analog front-end stage (e.g., as shown in FIG. 1A).

In some embodiments, the second reference signal is determined to reduce a convergence time of the operational amplifier.

In some embodiments, the method further comprises the following steps. An average value of fingerprint sensing values is determined from the performing of the first scanning operation. The level of the second reference signal is determined based on the average value of the fingerprint sensing values.

In some embodiments, the level of the second reference signal is equal to the average value of the fingerprint sensing values subtracted from the level of the first reference signal.

In some embodiments, an electronic module 10 capable of fingerprint sensing can be configured to be coupled to a fingerprint sensor having a plurality of fingerprint sensing pixels. The electronic module 10 comprises a fingerprint sensing driver circuit. The fingerprint sensing driver circuit includes a fingerprint sensing circuit and a control unit. The fingerprint sensing circuit is for being coupled to the fingerprint sensor and obtaining fingerprint sensing data, and includes an analog front-end stage. The control unit, coupled to the fingerprint sensing circuit, is for fingerprint sensing. The control unit is configured to perform a plurality of operations. The operations include a first scanning operation on at least a first portion of the fingerprint sensing pixels by using a first reference signal being applied to a reference terminal of the analog front-end stage to obtain a level of a second reference signal based on a sensing result of the first scanning operation. The operations also include a second scanning operation on at least a second portion of the fingerprint sensing pixels by using a second reference signal being applied to the reference terminal of the analog front-end stage, wherein the second reference signal is different from the first reference signal.

In some embodiments, the control unit is further configured to obtain a touch position on a touch panel, wherein the first scanning operation is performed on the first portion with respect to the touch position.

The following provides embodiments based on the method as shown in FIG. 1F. Systems, devices, and methods for reference voltage adjustment in a fingerprint sensing driver circuit or FTDI chip are introduced.

The following describes implementations of the CDS (correlated double sampling) reference voltage adjustment mechanism in a fingerprint sensing driver circuit or FTDI chip (e.g., in a computing device (e.g., a smart device)).

In general, correlated double sampling (CDS) is a method to measure electrical values such as voltages or currents that allows removing an undesired offset. It is often used when measuring sensor outputs. The output of the sensor is measured twice: once in a known condition and once in an unknown condition. The value measured from the known condition is then subtracted from the value measured from the unknown condition to generate a value with a known relation to the physical quantity being measured. It is noted that in the following embodiments, a modified or specific implementation based on the concept of the CDS may be used; however, the implementation of the present disclosure is not limited thereto.

Referring to FIG. 1A again, a process of a display panel and an FTDI for fingerprint unlocking is illustrated. For example, the FTDI fingerprint recognition process involves the panel emitting light (e.g., as represented by a pattern indicated by ICN) from the light source to the area where the finger presses. The light is reflected by the ridges and valleys of the fingerprint and then converted into sensing signals (e.g., voltage signals) by the fingerprint sensing pixels (e.g., TFT sensor) on the panel. The fingerprint sensing signals are then transmitted to the FTDI. After amplification and A/D conversion, the whole image data will be output to the backend algorithm for fingerprint recognition to complete the fingerprint unlocking process. Referring to FIG. 1A, the fingerprint sensing array (e.g., TFT sensor array) can be arranged over the entire display panel area, which is convenient for fingerprint unlocking at any location.

Since the fingerprint sensor (e.g., the fingerprint sensing pixels) is implemented on the entire panel, the traces for signal readout are required to be routed through the entire panel. The traces for signal readout are long and have high parasitic capacitances, which causes time delays when the AFE reads the sensing signals from the fingerprint sensing pixels (e.g., sensing currents from the photodiodes).

Figure 2A:
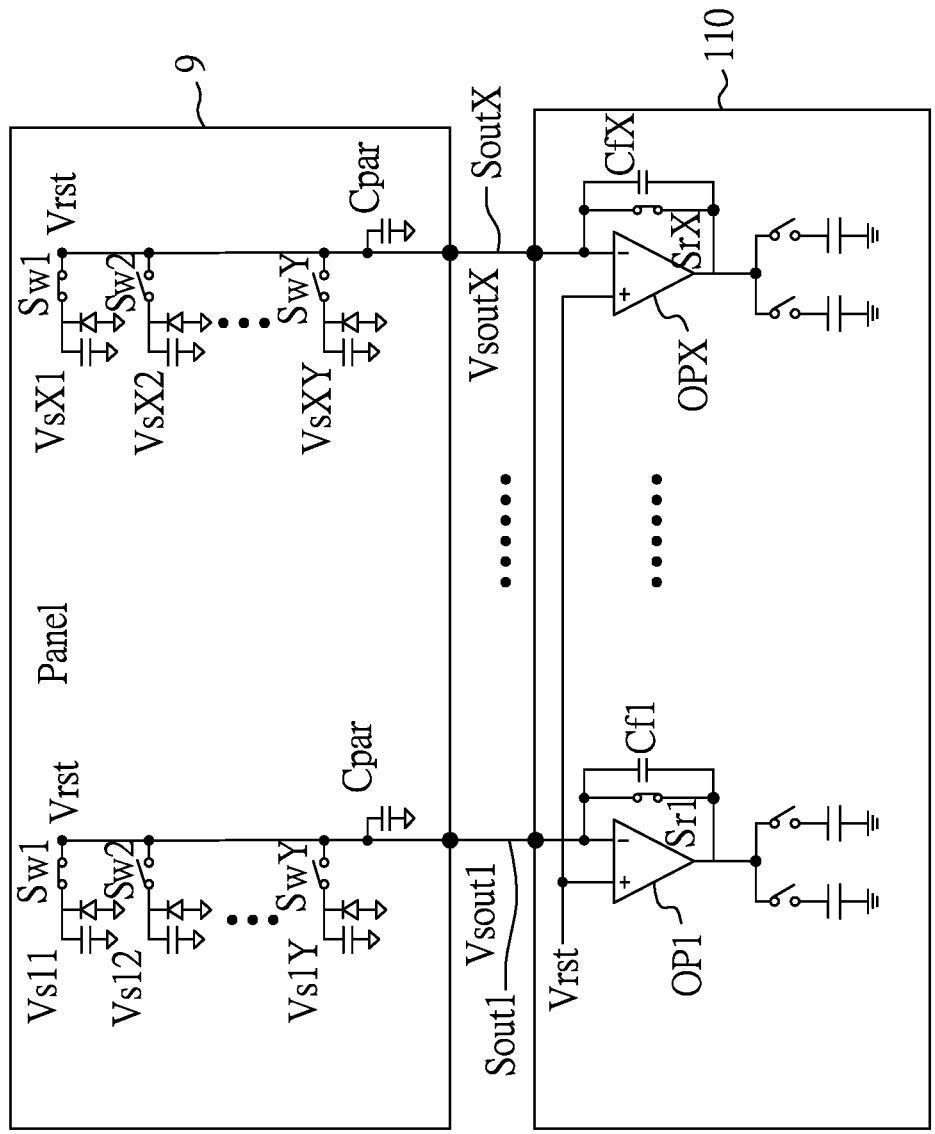
FIG. 2A is the schematic diagram of a panel and readout IC, which shows the reset panel photodiode voltage.

CDS can be divided into or includes at least four phases (or considered as steps). First, as shown in FIG. 2A, each fingerprint sensing pixel on the display panel 9 is reset, by using a front-end amplifier (e.g., indicated by OP1 to OPX; for simplification, OP is used to indicate corresponding one of OP1 to OPX) on a readout IC (e.g., implemented in the single chip, such as the fingerprint sensing circuit 100 of the fingerprint sensing driver circuit 11) corresponding to each column of the fingerprint sensing pixels of the display panel 9. Specifically, each of feedback switches (e.g., Sr1 to SrX) of the front-end amplifier (represented by OP) is turned on so that the front-end amplifier OP's output voltage can be locked at a reset voltage Vrst, and pixel switches Sw1 to SwY are then turned on one by one in sequence, and turned off after reset, resulting in the fingerprint sensing array of the whole panel having a voltage reset to the reset voltage Vrst. It is noted that in FIG. 2A and other similar Figures, the display panel 9 and the fingerprint sensing circuit 110 are partially represented by two separate blocks and the blocks as illustrated are irrelevant to circuit connection.

Secondly, after the fingerprint sensing pixels (e.g., including a photodiode and a capacitor in parallel) are reset to the reset voltage Vrst, the light reflected back is different due to the different refractive indices of the light irradiation and the contact surface between the finger and the panel glass, allowing the fingerprint sensing pixels to produce respective sensing currents (e.g., photocurrents) that are stored on the capacitances of the corresponding fingerprint sensing pixels. Meanwhile, the capacitances have corresponding voltages of Vs11, Vs12, . . . , Vs1Y to VsXY.

Figure 2B:
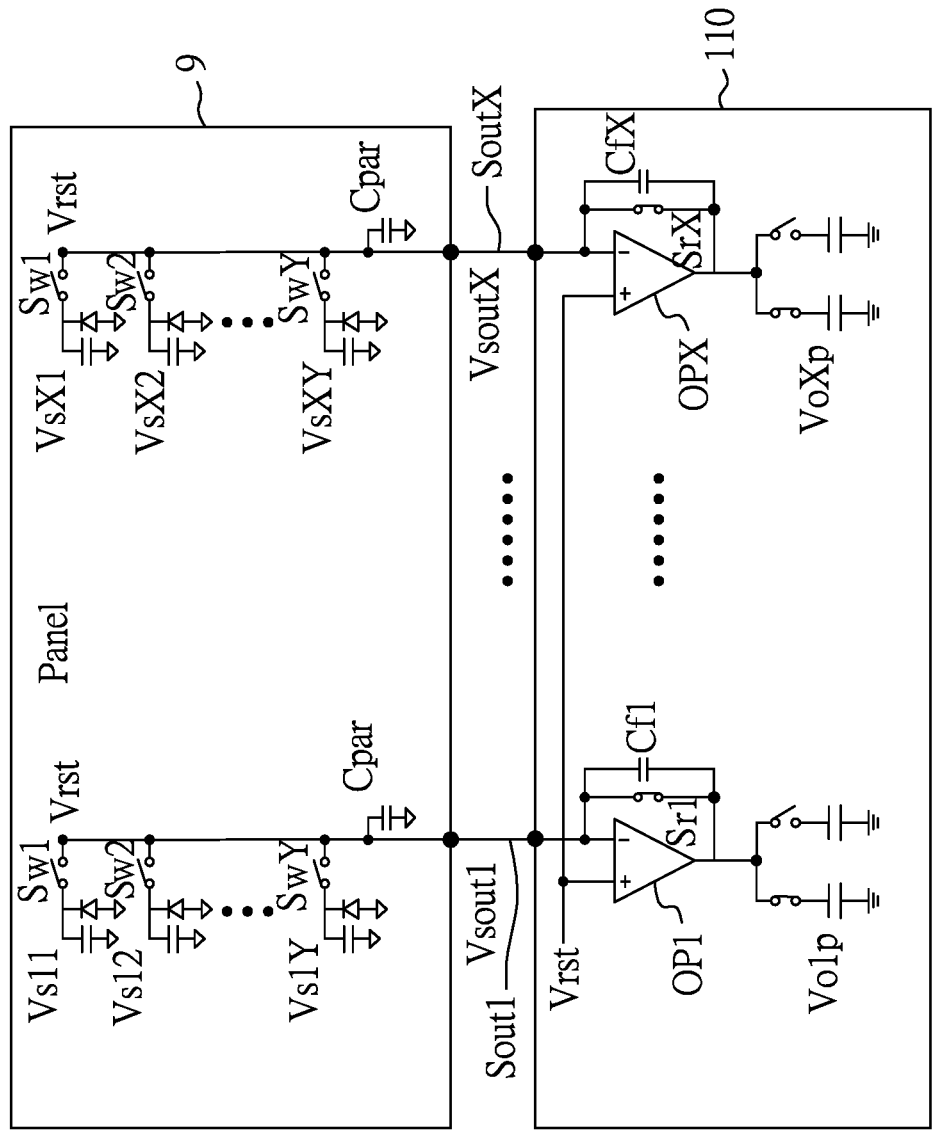
FIG. 2B is the schematic diagram of a panel and readout IC, which shows the first sampling of correlated double sampling (CDS).

Thirdly, as shown in FIG. 2B, the front-end amplifier's feedback switches Sr1 to SrX are turned on, but the pixel switches Sw1 to SwY for the fingerprint sensing pixels are not turned on. At this time, the parasitic capacitances Cpar are charged to the reset voltage Vrst, and the two terminals of feedback capacitances Cf1 to CfX are discharged to no voltage difference. Then, the first sampling is performed to obtain sampled voltages Vo1p to VoXp, each of which is obtained by sampling the offset voltage of the corresponding front-end amplifier OP plus the reset voltage Vrst.

Figure 2C:
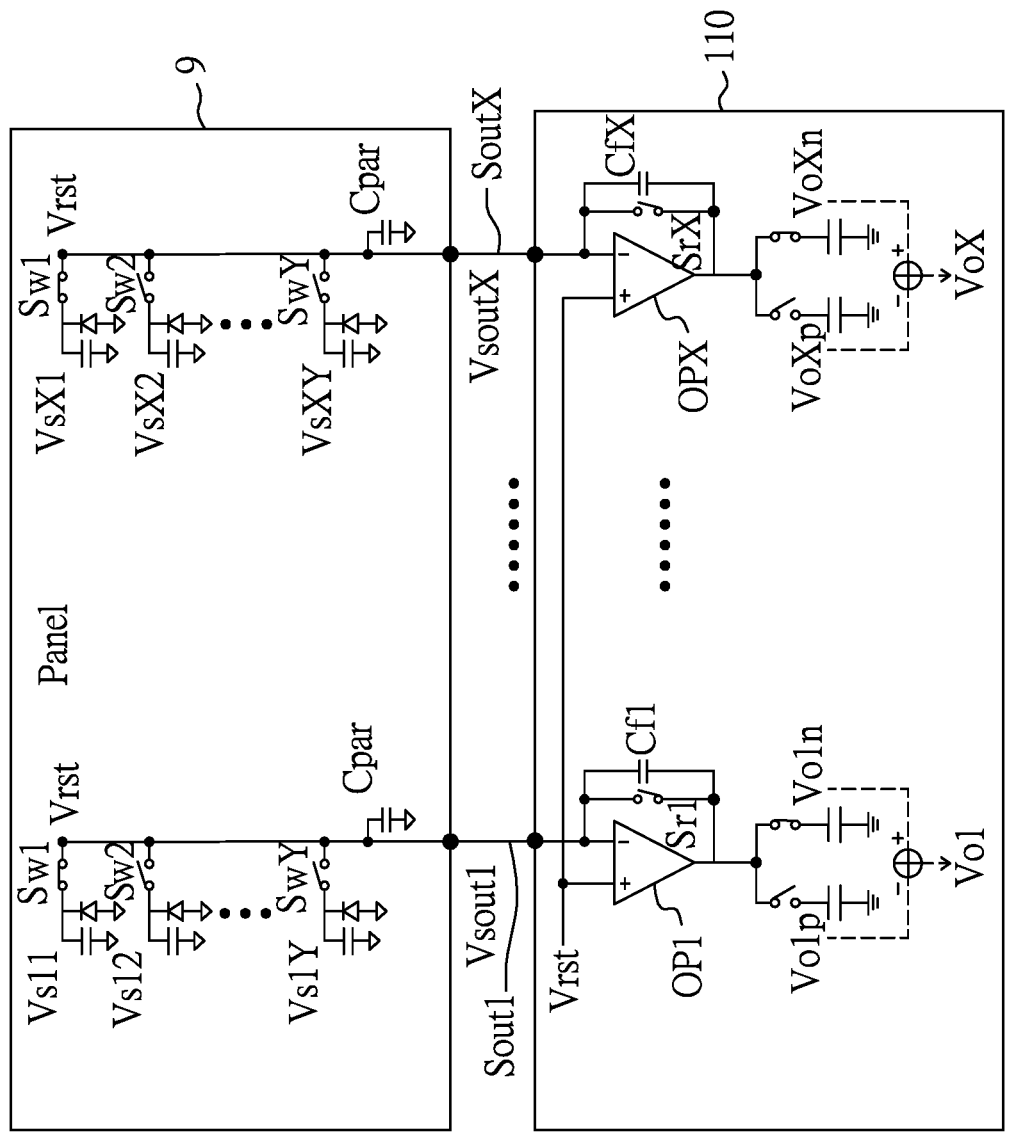
FIG. 2C is a schematic diagram of a panel and readout IC, illustrating the second sampling of CDS, and subtraction readouts.

Fourthly, as shown in FIG. 2C, the pixel switch (e.g., Sw1) is turned on; since the voltage signal (e.g., Vsout1 to VsoutX) will be locked at the reset voltage Vrst plus the front-end amplifier's offset voltage by the front-end amplifier's feedback loop, the pixel exposure charge will be amplified to the front-end amplifier's output. Meanwhile, a second sampling is performed to obtain sampled voltages Vo1n to VoXn, each of which is obtained by sampling the offset voltage of the corresponding front-end amplifier OP plus the reset voltage Vrst plus Qlight/Cf, wherein Qlight represents the charge amount of the corresponding fingerprint sensing pixel, and Cf represents the feedback capacitance of the corresponding front-end amplifier OP (e.g., Cf represents one of Cf1 to CfX).

By subtracting the sampled voltages of the first sampling from those of the second sampling, the offset voltage and reset voltage Vrst can be eliminated to thereby obtain corresponding Qlight/Cf values of fingerprint sensing pixels as voltage differences Vo1 to Vox. The above steps three and four are repeated (e.g., with respect to each column) so as to complete the image reading for a fingerprint for the whole panel.

Figure 3:
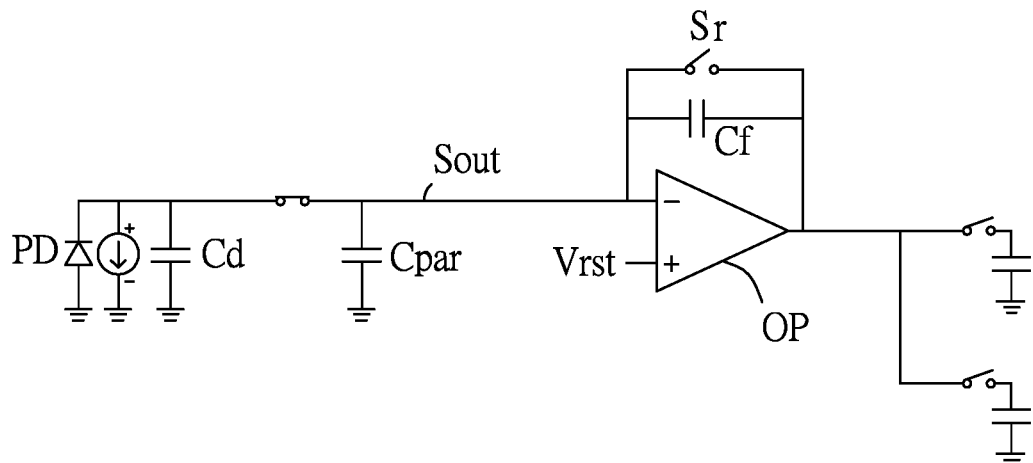
FIG. 3 is the schematic block diagram of the feedback loop for the second sampling.

FIG. 3 is a schematic block diagram of the feedback loop for the second sampling, showing a fingerprint sensing pixel coupled to a front-end amplifier through a trace for the sake of simplicity and illustration of the circuit as shown in FIG. 2A or similar Figures. In FIG. 3, a fingerprint sensing pixel, for example, includes a photodiode and a storage capacitor Cd, or further includes other elements, while the front-end amplifier OP has a feedback capacitance Cf and a feedback switch Sr. The parasitic capacitance Cpar of the trace Sout that extends through the display panel is large (e.g., about 50 pF level), wherein the trace Sout can be used to represent a corresponding one of traces Sout1 to SoutX, shown in FIG. 2A or similar Figures. However, in order to convert the induced charge of the fingerprint sensing pixel into a voltage signal, the feedback capacitance Cf of the OP is small (e.g., about 0.1 pF level), and the feedback of the parasitic capacitance Cpar to the feedback capacitance Cf causes tens or hundreds (or more) of times (e.g., about 500 times) of a decay of the OP's bandwidth relative to the unit gain bandwidth, and a larger stabilization time is required for the two sampling phases of the CDS.

It can be seen that in the aforementioned case the AFE requires a long stabilization time due to the larger parasitic capacitance Cpar. Accordingly, in the various embodiments provided below, the reference voltage of the CDS can be adjusted with each exposure voltage so that the two readout voltages of the CDS are similar. By reducing the difference between the two output voltages of the AFE, the stabilization time required is reduced. Therefore, by adjusting the reference voltage of the CDS, the implementation can reduce the difference between the two sampling voltages of the CDS and reduce the stabilization time required for the AFE output between the samplings, thus improving the efficiency of signal acquiring.

Figure 4:
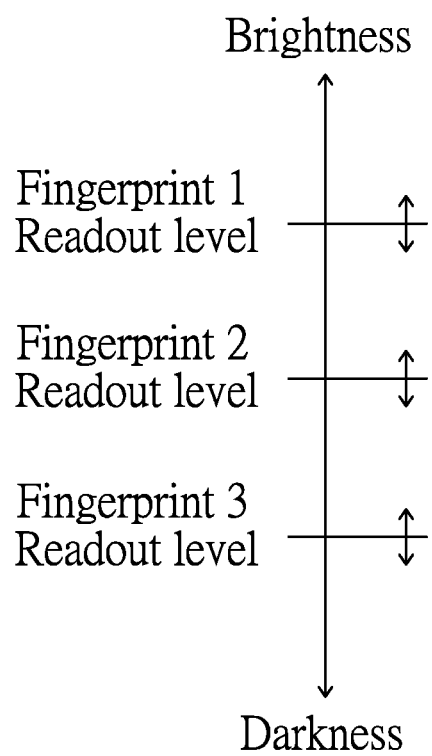
FIG. 4 is a schematic diagram of the brightness and darkness distribution of fingerprints.

FIG. 4 is a schematic diagram of the distribution of brightness and darkness of fingerprints. As shown in FIG. 4, the difference between the brightness and darkness of the ridges and valleys of the fingerprint is very small (e.g., about 10 mV), but the overall environment difference is large (e.g., 1V level).

Figure 5:
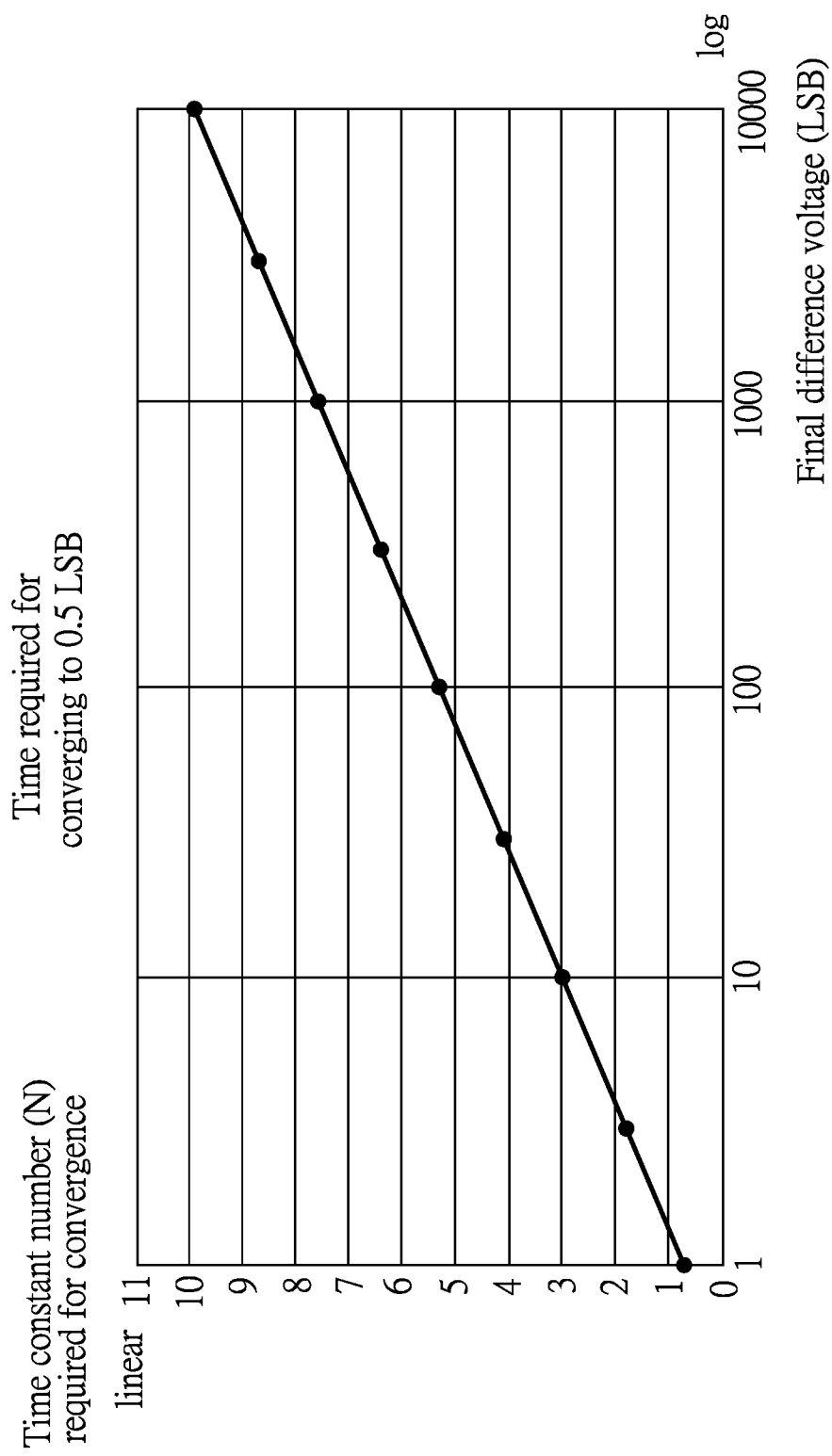
FIG. 5 shows the relationship between time constant number required for convergence (N) and the final difference voltage (LSB).

FIG. 5 shows the relationship between time constant number required for convergence (N) and the final difference voltage (LSB) to indicate time required for voltage converging to 0.5LSB, where the time required for convergence of the AFE between the fingerprint voltage and the reference voltage can be derived and the change in voltage required to guarantee a change in the output code level is called the least significant bit (LSB) voltage. As shown in FIG. 5, if an average sensing voltage for fingerprint sensing signals, for example, is taken as the reference value when a sampling of CDS is read out, the voltage difference that needs to be changed when the AFE is read out can be reduced, and the convergence time required for the difference between the brightness and darkness of the fingerprint pixels can be reduced, and the reading accuracy can also be improved with the fixed convergence time. In this manner, dynamic reference signal adjustment for sampling in fingerprint sensing can facilitate the effectiveness and efficiency of the fingerprint sensing process. However, the implementation of the present disclosure is not limited to the example of the reference signal value.

Figure 6A:
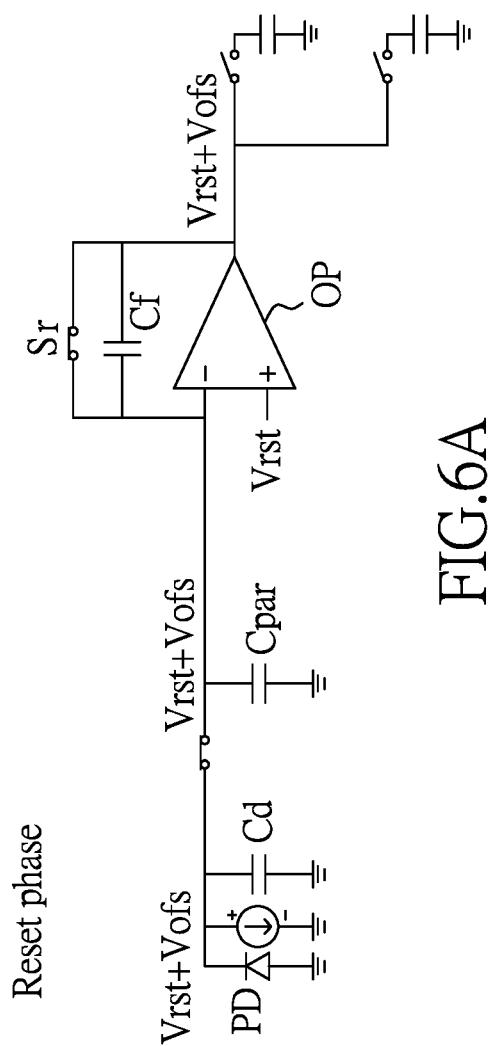
FIG. 6A shows an example of a loop operation in the reset phase.

FIG. 6A illustrates an example of the operation of the circuit in the reset phase. In the operation of the reset phase as shown in FIG. 6A, the required reset voltage is output to the photo-diode PD via the OP, and since the OP has an offset voltage (e.g., indicated by Vofs), it resets the voltage to Vrst+Vofs.

Vexpa is the average exposure voltage of at least one portion (e.g., a center of a fingerprint or a reduced portion including the center) of a region where the fingerprint is detected, and Vexpd is the difference between the fingerprint pixel and the average of the finger center.

Figure 6B:
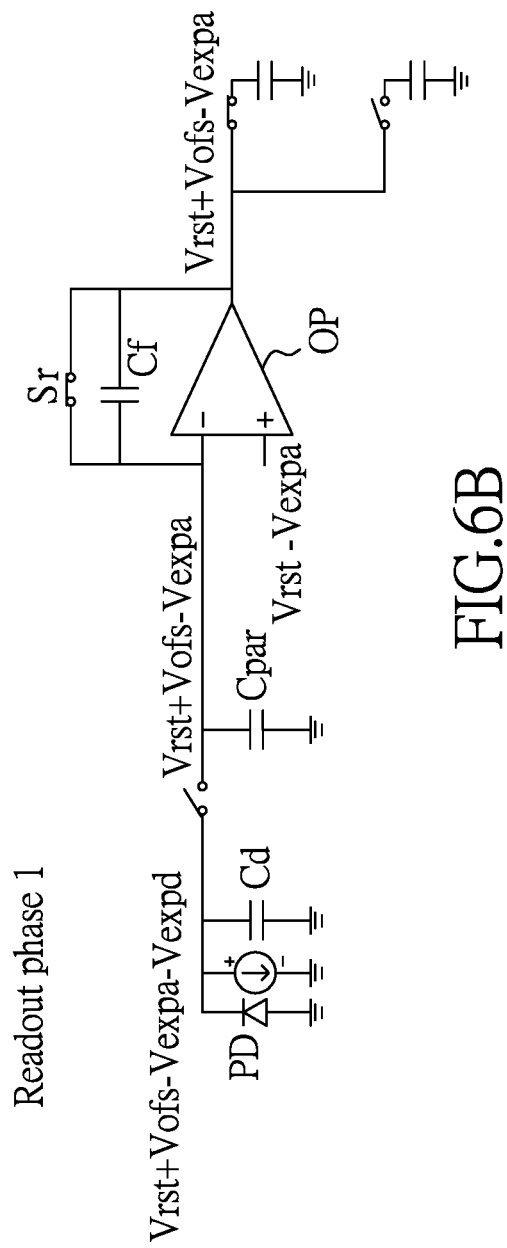
FIG. 6B shows examples of a loop operation in a readout phase 1.

FIG. 6B illustrates an example of the operation of the loop in readout phase 1. In FIG. 6B, for example, during CDS phase 1, Vrst−Vexpa (where default value is used) is applied to a non-inverting terminal of the OP, so that the first reading by CDS after feedback can obtain Vrst+Vofs-Vexpa as the first reading voltage.

Figure 6C:
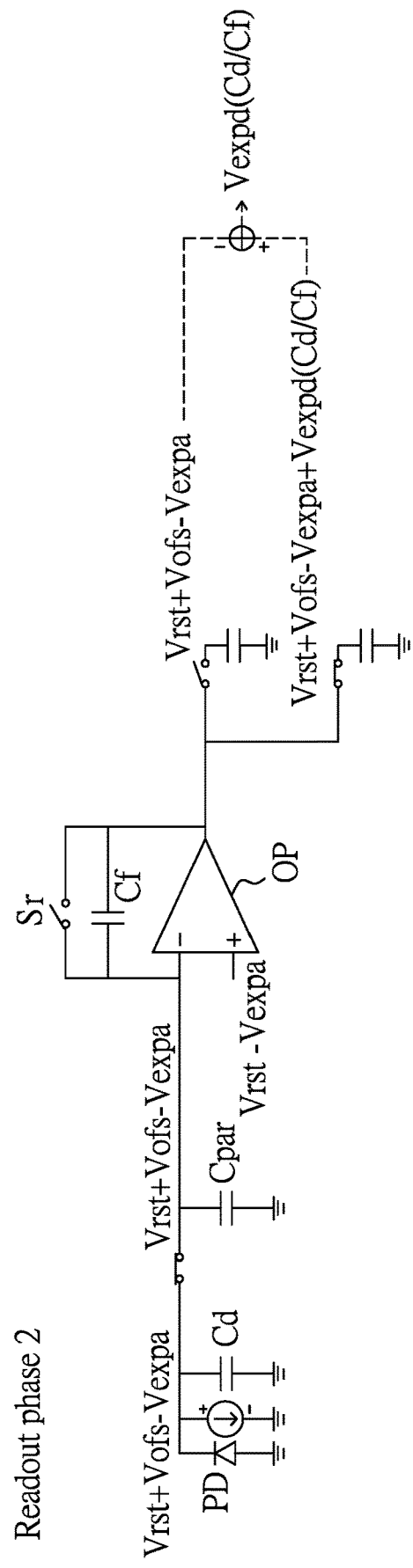
FIG. 6C shows an example of a loop operation in a readout phase 2.

FIG. 6C illustrates an example of the operation of the loop in the readout phase 2. The second readout of the CDS reads out the exposure voltage Vrst+Vofs-Vexpa-Vexpd, and by way of the feedback of the OP, Vexpd is read out partially and amplified to the OP output, and the second sampling voltage of the CDS is Vrst+Vofs−Vexpa+Vexpd (Cd/Cf). Between the two instances of sampling, the voltage difference of OP output is expressed by Vexpd (Cd/Cf), which requires only a short time to stabilize for the OP due to the small voltage difference between the average of the finger center and the fingerprint pixel.

Figure 7:
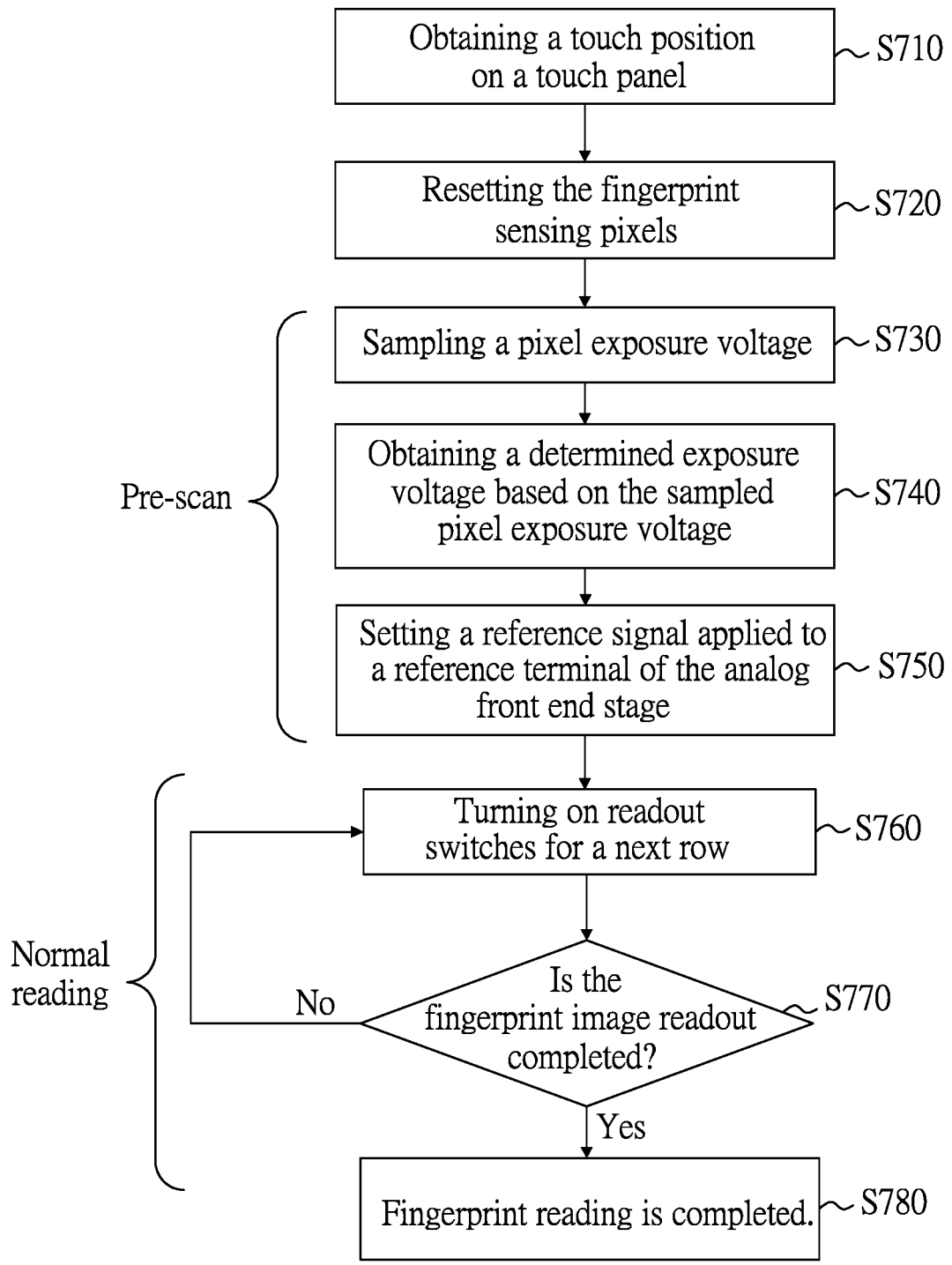
FIG. 7 shows a flowchart illustrating an implementation example of CDS reference voltage adjustment mechanism.

FIG. 7 shows an illustrative flowchart of an implementation example of the FTDI CDS reference voltage adjustment mechanism. In step S710, a touch position on a touch panel, which is taken as a representative position or region of the fingerprint sensing area (e.g., a center of the fingerprint), is obtained. In step S720, the fingerprint sensing pixels are reset. In step S730, a pixel exposure voltage is sampled with respect to the representative position or region. In step S740, the sampled pixel exposure voltage is determined to obtain a determined exposure voltage. In step S750, a reference signal applied to the reference terminal (e.g., non-inverting terminal) of the analog front-end stage (e.g., OP) is set to be the determined exposure voltage. In step S760, readout switches for a next row are turned on. In step S770, it is determined whether the fingerprint image readout is completed. If so, the fingerprint reading is completed as shown in step S780. If not, the flow will be repeated from step S760.

As shown in FIG. 7, an example of this flow includes a pre-scan step (or called procedure) and a normal reading step. In this example, after a panel touch control unit (e.g., a touch driver circuit (such as 19) implemented in a single chip such as FTDI) reports the finger position, sampling and reading out are performed on a representative region or position (e.g., the center) of the fingerprint or a position that represents the exposure of the finger. After the voltage with respect to the position is calculated, the voltage is provided to the positive terminal (non-inverting terminal) of the OP as the reference voltage. The whole finger image is read sequentially with the setting of this voltage to shorten the convergence time of AFE for image reading.

Figure 8:
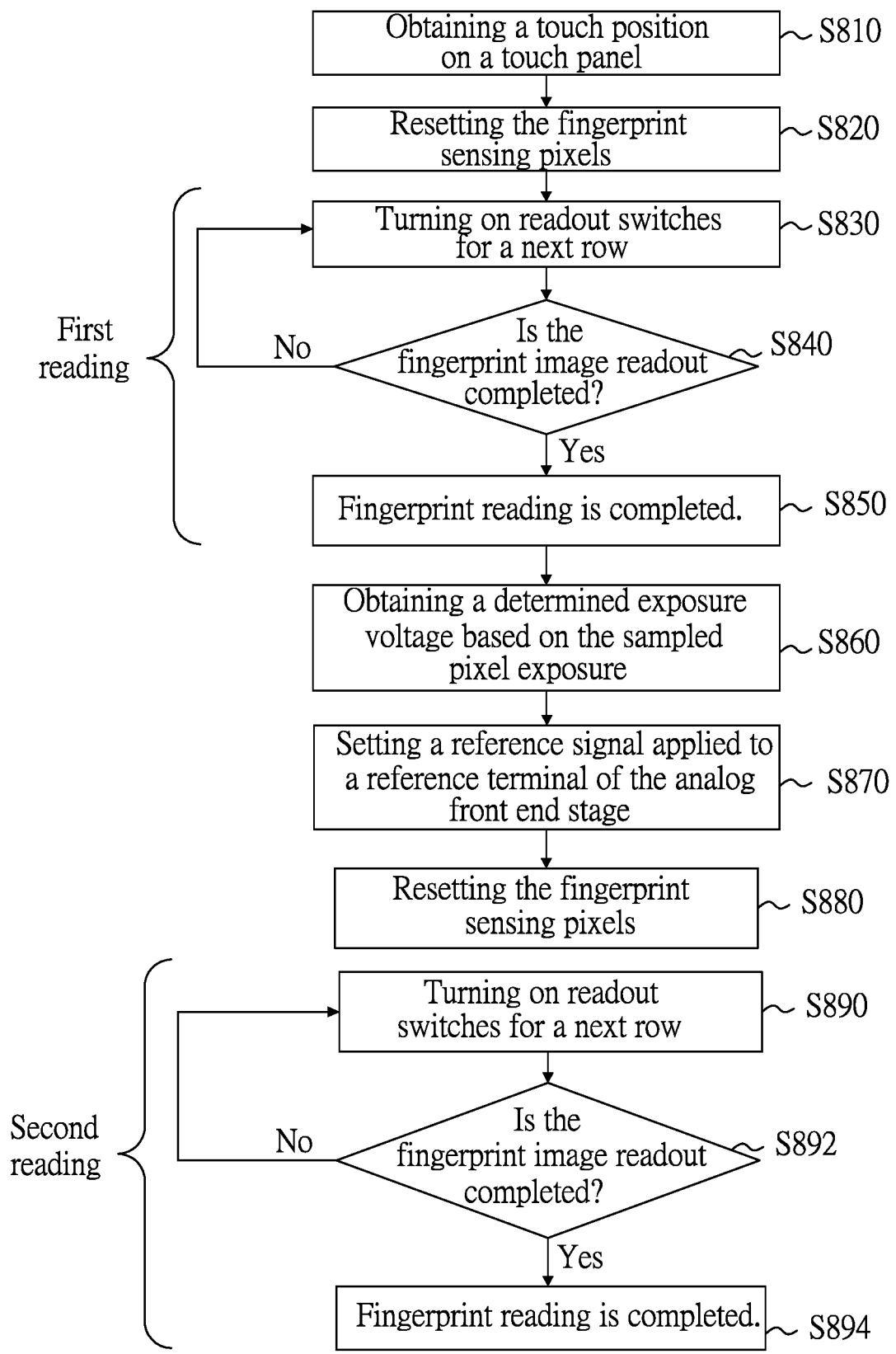
FIG. 8 shows a flowchart illustrating another implementation of the CDS reference voltage adjustment mechanism.

FIG. 8 shows a flowchart of another implementation of the FTDI CDS reference voltage adjustment mechanism. In step S810, a touch position on a touch panel, which is taken as a representative position or region of the fingerprint sensing area (e.g., a center of the fingerprint), is obtained. In step S820, the fingerprint sensing pixels are reset. In step S830, readout switches for a next row are turned on. In step S840, it is determined whether the fingerprint image readout is completed. If so, the fingerprint reading is completed as shown in step S850. If not, the flow will be repeated from step S830.

In step S860, the sampled pixel exposure voltage is determined to obtain a determined exposure voltage. In step S870, a reference signal applied to the reference terminal (e.g., non-inverting terminal) of the analog front-end stage (e.g., OP) is set to be the determined exposure voltage. In step S880, the fingerprint sensing pixels are reset.

In step S890, readout switches for a next row are turned on. In step S892, it is determined whether the fingerprint image readout is completed. If so, the fingerprint reading is completed as shown in step S894. If not, the flow will be repeated from step S890.

As shown in FIG. 8, the implementation example of this flow including a first reading (first image reading) step and a second reading (second image reading) step. In this example, a fingerprint image is read once (first image reading), and an appropriate CDS reference voltage is calculated by the computing unit, which is then applied to the OP's non-inverting terminal as a reference voltage.

Figure 9:
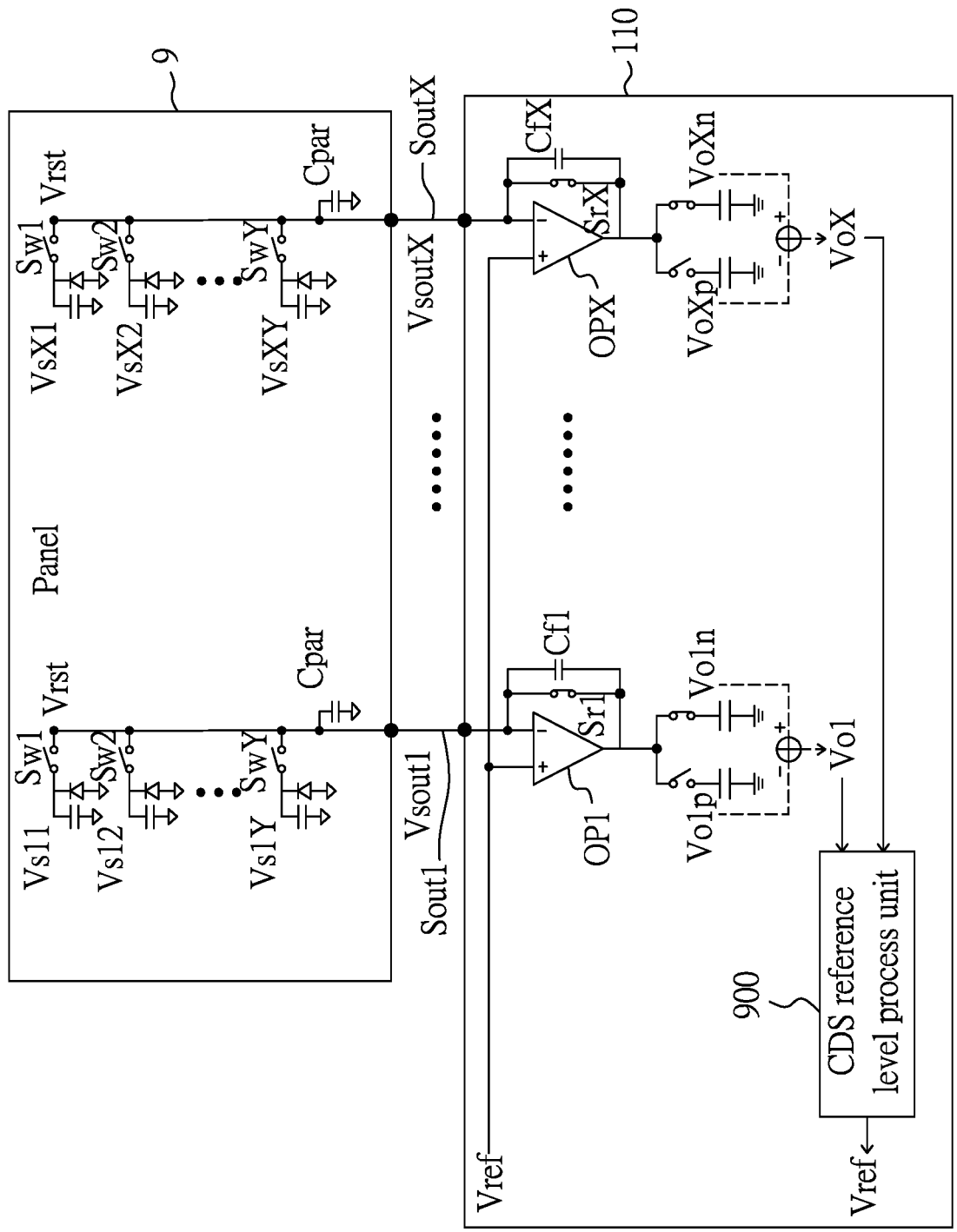
FIG. 9 shows a schematic diagram of an implementation of the panel and readout IC readout architecture.

FIG. 9 illustrates the circuit architecture of the panel CDS reference level adjustment mechanism. For example, a representative position or region of the fingerprint (e.g., a center or a position near the center of the fingerprint) is firstly selected and a reference signal required is determined by using a CDS reference level process unit 900 of the readout IC (e.g., implemented by a control unit of the fingerprint sensing driver circuit of the single chip) with respect to the representative position or region. The determined reference signal is applied to the AFE as a reference voltage to facilitate the reduction of the convergence time required for the AFE to perform CDS.

Figure 10:
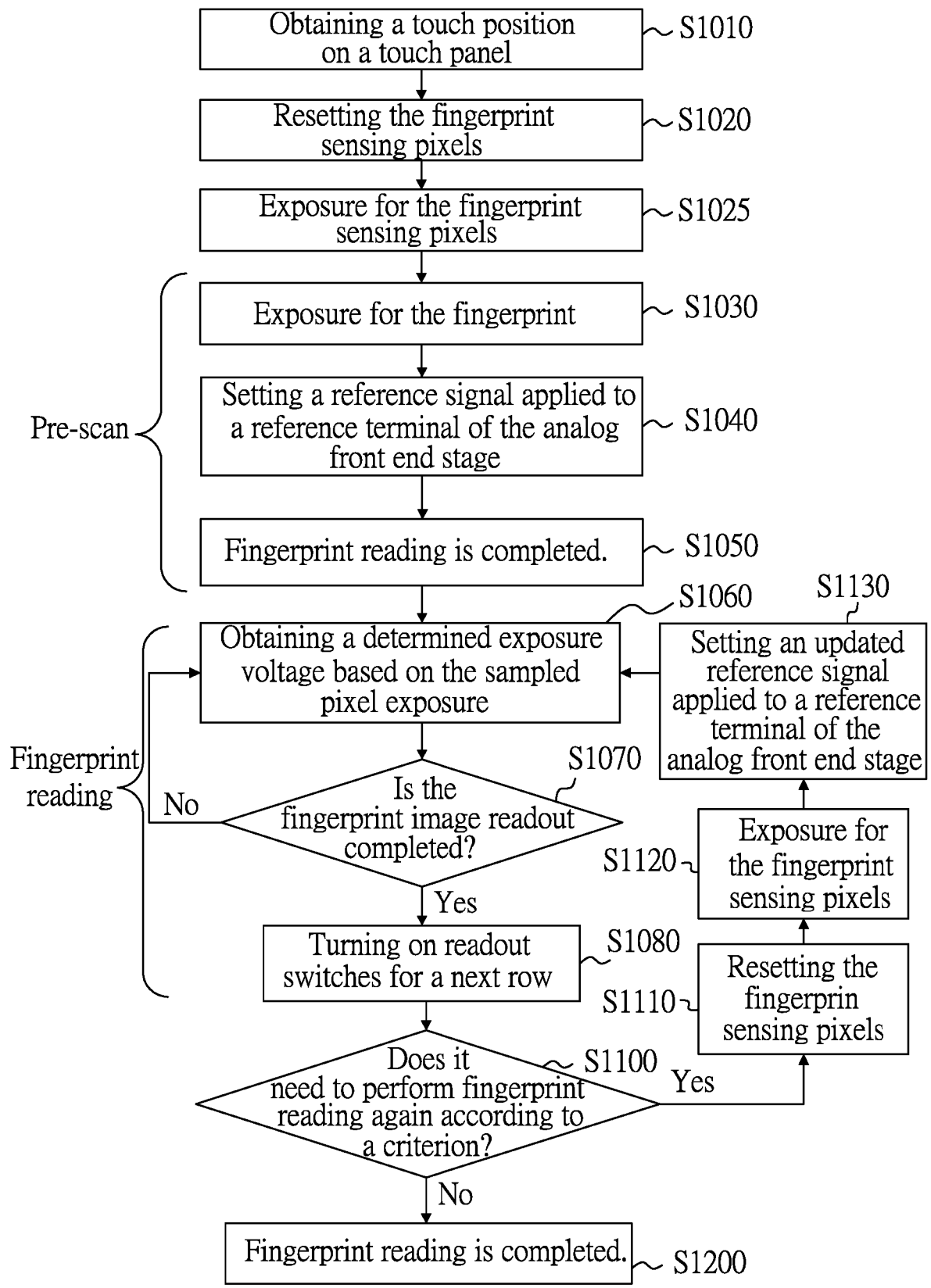
FIG. 10 shows a flowchart illustrating an implementation of the multiple CDS reference voltage adjustment readout flow.

FIG. 10 shows a schematic flow diagram of an implementation example of a multi-CDS reference voltage adaptive readout process.

In step S1010, a touch position on a touch panel, which is taken as a representative position or region of the fingerprint sensing area (e.g., a center of the fingerprint), is obtained. In step S1020, the fingerprint sensing pixels are reset. In step S1025, exposure for the fingerprint sensing pixels is performed. In step S1030, a pixel exposure voltage is sampled with respect to the representative position or region. In step S1040, the sampled pixel exposure voltage is determined to obtain a determined exposure voltage. In step S1050, a reference signal applied to the reference terminal (e.g., non-inverting terminal) of the analog front-end stage (e.g., OP) is set to be the determined exposure voltage. In step S1060, readout switches for a next row are turned on. In step S1070, it is determined whether the fingerprint image readout is completed. If so, the reading for a round is completed as shown in step S1080. If not, the flow will be repeated from step S1060.

In step S1100, it is determined if it is needed to read the fingerprint image again according to a criterion. If so, the method proceeds to step S1110; if not, the fingerprint reading is completed as shown in step S1200. For example, the criterion can be while-looping condition based on a threshold value, so as to repeat fingerprint image reading for a number of times, so that an accurate fingerprint image can be determined based on the multiple fingerprint images. In another example, the criterion can be other condition based on one or more factors.

In step S1110, the fingerprint sensing pixels are reset. In step S1120, exposure for the fingerprint sensing pixels is performed. In step S1130, an updated (or same) reference signal is applied to the reference terminal (e.g., non-inverting terminal) of the analog front-end stage (e.g., OP).

In this example, as shown in FIG. 10, in order to avoid the interference of dirt or noise on the finger, which may affect the accuracy of the pre-reading, the exposure and fingerprint image reading can be performed by adjusting the Vref (such as pre-scan) several times, in order to obtain an optimal fingerprint image, or to combine the fingerprint features of multiple images to create a more accurate fingerprint image. As shown in FIG. 10, after reading out is performed with respect to the representative position or region (e.g., the center) of the fingerprint, a reference voltage Vref can be generated for the first time according to the brightness of the representative position or region of the fingerprint so as to effectuate image reading. The reference voltage Vref for the first time thus generated is added to Vd for reference voltage adjustment. After the reference voltage adjustment, exposure and image reading are performed anew to obtain readout images. Then, the images can be sent to the processing unit (or application program) for determination and adjustment.

For instance, the voltage level of Vd can be not only variable but also positive and/or negative for reference voltage adjustment, so as to effectuate multiple times of exposure and image reading. In some examples, for multiple exposures and fingerprint image readout, the voltage level of Vd can be set to multiple values for reference voltage adjustment to enable multiple exposures and fingerprint image readout. In another example, the magnitude of Vd and the number of times of adjustments needed can be determined after the first pre-scan.

In FIG. 10, in step S1100, it is determined whether it needs to perform fingerprint reading again according to a criterion. For example, the criterion can be a criterion according to image quality, or a criterion according to the number of times of fingerprint reading. For example, when the number of times of fingerprint reading meets a threshold value (e.g., the threshold value equal to or greater than 2, 3, or other value), it is determined that it does not need to perform fingerprint reading again.

Figure 11:
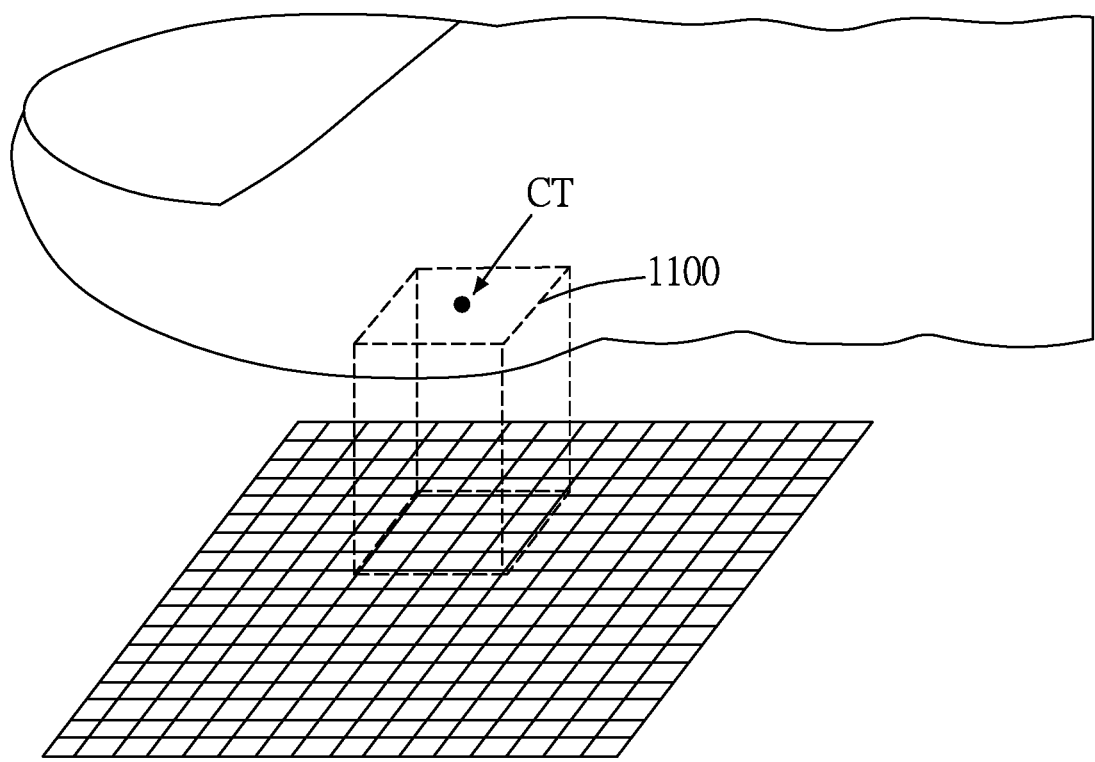
FIG. 11 illustrates an implementation of a pixel voltage prediction method.

In some embodiments or in the preceding embodiments, the pixel voltage prediction method can be used to adjust the CDS reference voltage by finding a voltage that represents the fingerprint voltage in the pre-reading (pre-scan) voltage. As illustrated in FIG. 11, a representative area such as a region, for example, 16 pixels (4×4) (e.g., the region is indicated by 1100 in FIG. 11) with respect to a representative position such as a center (e.g., indicated by CT) of the representative area, can be utilized so as to acquire the sensing voltage of these fingerprint sensing pixels, where the representative area can be any suitable area smaller than the original fingerprint area, such as 4×4, 6×6, 8×8 pixel size area or any other area. For example, the representative position can be regarded as a center of the fingerprint image. Certainly, the implementation of the present disclosure is not limited to the examples.

Then the CDS reference level process unit of the readout IC calculates the average (or median or any value that represents the reference area) of the reference area to obtain the reference voltage that represents the exposure voltage of the whole finger, and generates a new CDS. The reference voltage is then output to the non-inverting terminal of the OP to give the CDS reference voltage for the next "normal read" (i.e., all areas, such as the original fingerprint image area). This will facilitate the efficiency of adjustment.

Figure 12A:
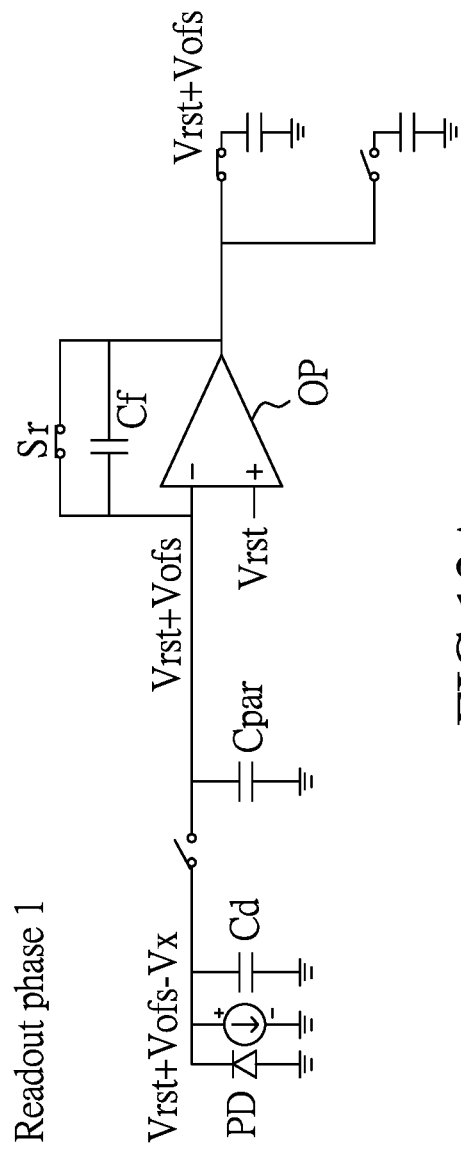
FIG. 12A shows an example of a loop operation in a readout phase 1.
Figure 12B:
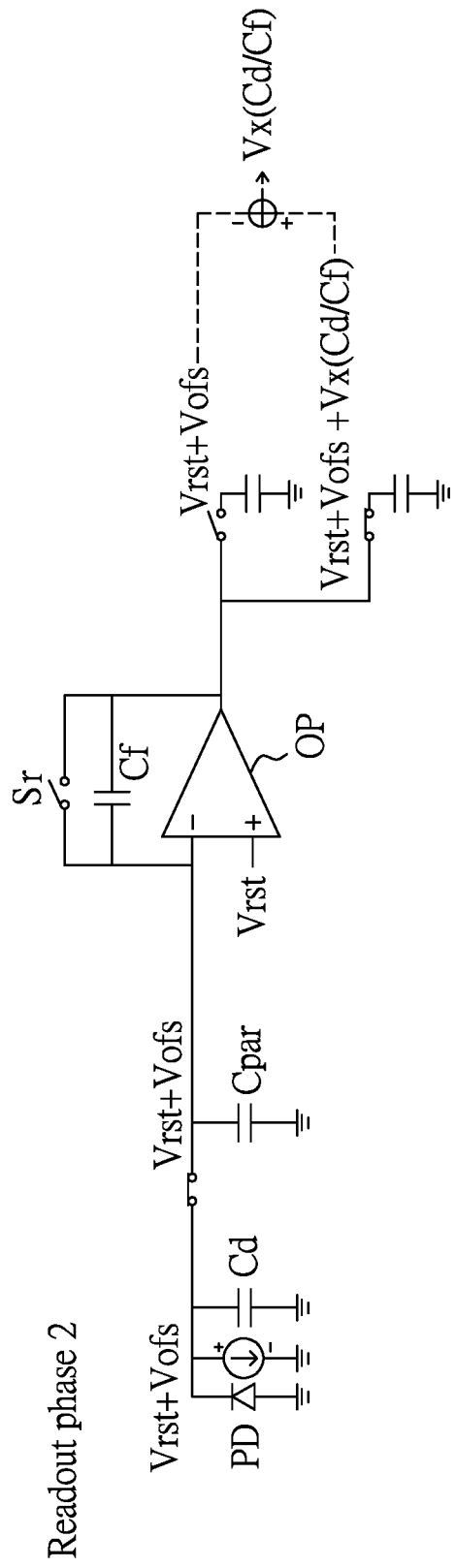
FIG. 12B shows an example of a loop operation in a readout phase 2.

In some embodiments, a method for figuring out (or determining) a pre-scan voltage is provided. By pre-scanning a reduced number of fingerprint sensing pixels' voltages, a representative voltage value of the representative position or region (e.g., a center of the fingerprint) can be obtained. As shown in FIG. 12A, a sampled voltage for the first sampling of CDS (CDS1 voltage) generated under Vrst (or other reference voltage) is read in readout phase 1. As shown in FIG. 12B, a sampled voltage for the second sampling of CDS (CDS2 voltage) is read in readout phase 2 to obtain the difference Vx (Cd/Cf) by subtracting the CDS1 voltage from the CDS2 voltage, wherein Vx indicates voltage difference between pixel voltages for the same fingerprint sensing pixel for the first and second sampling. With Vrst, Cd, and Cf being known parameters and Vofs being negligible small, the voltage value of Vrst+Vofs−Vx can be derived from Vx (Cd/Cf). The embodiments of the method for figuring out a pre-scan voltage are applicable to any embodiments of the aforesaid required pre-scan voltage.

The above-revealed implementations can improve the efficiency of capturing (or sampling) signal by adjusting the CDS reference voltage to reduce the voltage difference between CDS samples and reduce the time required to stabilize the AFE output between the sampling.

In addition, for example, a single chip integrated with a fingerprint sending driver circuit, a touch driver circuit, and a display driver circuit can be implemented to have at least two kinds of operation cycles (or called frame), display cycles and fingerprint cycles, being performed (or active) alternately, for time-sharing operation. In some embodiments, whether the reset, sampling, and readout (or selecting or sensing in short) actions can be done in a fingerprint (FPR) frame (or called a readout frame), or whether there is at least one display frame that makes the reset and readout reach in different FPR frames, is determined according factors such as the FPR module's operation speed and duration relative to the FPR frame. As such, the implementation of the invention is not limited by these examples.

There are different ways of doing this in practical applications. For example, even if the FPR module does not run fast enough, the FPR module can be designed so that the FPR FRAME time is sufficient to make it possible for an FPR frame to perform a reset, sampling and readout.

For example, in integrated ICs (such as FTDI IC, or other ICs with fingerprint processing), a display frame (or even touch frames) can be inserted between multiple FPR frames. In addition, the display frames, FPR module and other frames can be implemented with various time-sharing approaches, and the implementation of the present invention is not limited by these examples.

As such, the above various embodiments of the present disclosure provide a technology for facilitating fingerprint sensing signal sampling in a computing device. The technology is for dynamic reference signal adjustment in an electronic module capable of fingerprint sensing signal sampling. By utilizing the technology, the electronic module capable of fingerprint sensing signal sampling can perform reference signal adjustment dynamically so as to reduce the settling time of an analog front-end circuit of the electronic module.

In addition, the time required for sampling the fingerprint sensing signals can be reduced, based on the technology for dynamic reference signal adjustment, and can be configured to be within a required time interval allowable for processing the fingerprint sensing signals, so as to resolve the challenge that the fingerprint sensing functionality is to be implemented on the full-screen of the display panel.

As a result, the computing device that executes an application program, such as fingerprint identification, based on the output of the electronic module can benefit from the technology for dynamic reference signal adjustment so as to facilitate fingerprint sensing effectiveness and efficiency, as a whole, of the application program.

While the present disclosure has been described by means of specific embodiments, numerous modifications and variations could be made thereto by those skilled in the art without departing from the scope and spirit of the present disclosure set forth in the claims.

What is claimed is:

1. A method for fingerprint sensing of an electronic module capable of fingerprint sensing, the electronic module for being coupled to a fingerprint sensor having a plurality of fingerprint sensing pixels, the electronic module including an analog front-end stage for being coupled to the fingerprint sensing pixels, the method comprising:
performing a first scanning operation on at least a first portion of the fingerprint sensing pixels by using a first reference signal being applied to a reference terminal of the analog front-end stage to obtain a level of a second reference signal based on a sensing result of the first scanning operation; and
performing a second scanning operation on at least a second portion of the fingerprint sensing pixels by using the second reference signal being applied to the reference terminal of the analog front-end stage, wherein the second reference signal is different from the first reference signal.

2. The method according to claim 1, wherein the second portion includes the first portion.

3. The method according to claim 1, wherein the second portion corresponds to a fingerprint sensing area, and the first portion corresponds to a representative region of the fingerprint sensing area.

4. The method according to claim 3, wherein the first scanning operation comprises reading sensing signals from at least one sample fingerprint sensing pixel located in the representative region of the fingerprint sensing area and the second scanning operation comprises reading sensing signals from all fingerprint sensing pixels corresponding to the fingerprint sensing area.

5. The method according to claim 1, further comprising performing a reset operation prior to the first scanning operation.

6. The method according to claim 2, further comprising:
obtaining a level of a third reference signal by the second scanning operation; and
performing a third scanning operation on at least the second portion of the fingerprint sensing pixels by using the third reference signal being applied to the reference terminal of the analog front-end stage, wherein the third reference signal is different from the second reference signal.

7. The method according to claim 1, wherein the first portion is equal to the second portion.

8. The method according to claim 7, wherein each of the first portion and the second portion corresponds to a fingerprint sensing area.

9. The method according to claim 8, wherein each of the first scanning operation and the second scanning operation comprises reading sensing signals of all fingerprint sensing pixels corresponding to the fingerprint sensing area.

10. The method according to claim 8, further comprising performing a respective reset operation prior to each of the first scanning operation and the second scanning operation.

11. The method according to claim 1, further comprising:
determining the level of the second reference signal based on an average value of fingerprint sensing values from the performing of the first scanning operation and the level of the first reference signal.

12. The method according to claim 11, wherein the level of the second reference signal is equal to the average value of the fingerprint sensing values subtracted from the level of the first reference signal.

13. The method according to claim 11, wherein the analog front-end stage comprises an operation amplifier having an input terminal serving as the reference terminal of the analog front-end stage.

14. The method according to claim 13, wherein the second reference signal is determined to reduce a convergence time of the operational amplifier.

15. The method according to claim 1, further comprising:
determining an average value of fingerprint sensing values from the performing of the first scanning operation; and
determining the level of the second reference signal based on the average value of the fingerprint sensing values.

16. The method according to claim 15, wherein the level of the second reference signal is equal to the average value of the fingerprint sensing values subtracted from the level of the first reference signal.

17. An electronic module capable of fingerprint sensing, for being coupled to a fingerprint sensor having a plurality of fingerprint sensing pixels, the electronic module comprising:
a fingerprint sensing driver circuit including:
a fingerprint sensing circuit for being coupled to the fingerprint sensor and obtaining fingerprint sensing data, the fingerprint sensing circuit including an analog front-end stage; and
a control unit, coupled to the fingerprint sensing circuit, for fingerprint sensing, wherein the control unit is configured to perform operations including:
performing a first scanning operation on at least a first portion of the fingerprint sensing pixels by using a first reference signal being applied to a reference terminal of the analog front-end stage to obtain a level of a second reference signal based on a sensing result of the first scanning operation; and
performing a second scanning operation on at least a second portion of the fingerprint sensing pixels by using a second reference signal being applied to the reference terminal of the analog front-end stage, wherein the second reference signal is different from the first reference signal.

18. The electronic module according to claim 17, wherein the second portion includes the first portion.

19. The electronic module according to claim 17, wherein the second portion corresponds to a fingerprint sensing area, and the first portion corresponds to a representative region of the fingerprint sensing area.

20. The electronic module according to claim 19, wherein the first scanning operation comprises reading sensing signals from at least one sample fingerprint sensing pixel located in the representative region of the fingerprint sensing area and the second scanning operation comprises reading sensing signals from all fingerprint sensing pixels corresponding to the fingerprint sensing area.

21. The electronic module according to claim 17, wherein the operations further comprise performing a reset operation prior to the first scanning operation.

22. The electronic module according to claim 18, wherein the operations further comprise:
obtaining a level of a third reference signal by the second scanning operation; and
performing a third scanning operation on at least the second portion of the fingerprint sensing pixels by using the third reference signal being applied to the reference terminal of the analog front-end stage, wherein the third reference signal is different from the second reference signal.

23. The electronic module according to claim 17, wherein the first portion is equal to the second portion.

24. The electronic module according to claim 23, wherein each of the first portion and the second portion corresponds to a fingerprint sensing area.

25. The electronic module according to claim 24, wherein each of the first scanning operation and the second scanning operation comprises reading sensing signals of all fingerprint sensing pixels corresponding to the fingerprint sensing area.

26. The electronic module according to claim 24, wherein the operations further comprise performing a respective reset operation prior to each of the first scanning operation and the second scanning operation.

27. The electronic module according to claim 17, wherein the operations further comprise:
determining the level of the second reference signal based on an average value of fingerprint sensing values from the performing of the first scanning operation and the level of the first reference signal.

28. The electronic module according to claim 27, wherein the level of the second reference signal is equal to the average value of the fingerprint sensing values subtracted from the level of the first reference signal.

29. The electronic module according to claim 27, wherein the analog front-end stage comprises an operation amplifier having an input terminal serving as the reference terminal of the analog front-end stage.

30. The electronic module according to claim 29, wherein the second reference signal is determined to reduce a convergence time of the operational amplifier.

31. The electronic module according to claim 17, wherein the operations further comprise:
   determining an average value of fingerprint sensing values from the performing of the first scanning operation; and
   determining the level of the second reference signal based on the average value of the fingerprint sensing values.

32. The electronic module according to claim 31, wherein the level of the second reference signal is equal to the average value of the fingerprint sensing values subtracted from the level of the first reference signal.

33. The electronic module according to claim 17, wherein the control unit is further configured to:
   obtain a touch position on a touch panel, wherein the first scanning operation is performed on the first portion with respect to the touch position.

34. The electronic module according to claim 17, wherein the electronic module is a single chip.

35. A computing apparatus comprising:
   a display panel with a fingerprint sensor;
   an electronic module capable of fingerprint sensing, coupled to the display panel, the electronic module comprising:
   a fingerprint sensing driver circuit including:
      a fingerprint sensing circuit for being coupled to the fingerprint sensor and obtaining fingerprint sensing data, including an analog front-end stage; and
      a control unit, coupled to the fingerprint sensing circuit, for fingerprint sensing, wherein the control unit is configured to:
      perform a first scanning operation on at least a first portion of the fingerprint sensing pixels by using a first reference signal being applied to a reference terminal of the analog front-end stage to obtain a level of a second reference signal based on a sensing result of the first scanning operation; and
      perform a second scanning operation on at least a second portion of the fingerprint sensing pixels by using a second reference signal being applied to the reference terminal of the analog front-end stage, wherein the second reference signal is different from the first reference signal.

36. The computing apparatus according to claim 35, wherein the electronic module is a single chip.

* * * * *